United States Patent
Painchaud-April et al.

(10) Patent No.: US 12,216,091 B2
(45) Date of Patent: Feb. 4, 2025

(54) PHASE-BASED APPROACH FOR ULTRASONIC INSPECTION

(71) Applicant: Evident Canada, Inc., Québec (CA)

(72) Inventors: Guillaume Painchaud-April, L'Ancienne-Lorette (CA); Alain Le Duff, Quebec (CA); Charles Brillon, Quebec (CA)

(73) Assignee: Evident Canada, Inc., Québec (CA)

( * ) Notice: Subject to any disclaimer, the term of this patent is extended or adjusted under 35 U.S.C. 154(b) by 0 days.

(21) Appl. No.: 17/905,107

(22) PCT Filed: Feb. 25, 2021

(86) PCT No.: PCT/CA2021/050222
§ 371 (c)(1),
(2) Date: Aug. 26, 2022

(87) PCT Pub. No.: WO2021/168565
PCT Pub. Date: Sep. 2, 2021

(65) Prior Publication Data
US 2023/0127374 A1    Apr. 27, 2023

Related U.S. Application Data

(60) Provisional application No. 63/087,521, filed on Oct. 5, 2020, provisional application No. 62/983,172, filed on Feb. 28, 2020.

(51) Int. Cl.
| | | |
|---|---|---|
| *G01N 29/06* | (2006.01) | |
| *G01N 29/07* | (2006.01) | |
| *G01N 29/26* | (2006.01) | |

(52) U.S. Cl.
CPC ....... *G01N 29/262* (2013.01); *G01N 29/0654* (2013.01); *G01N 29/075* (2013.01);
(Continued)

(58) Field of Classification Search
CPC ........ G01N 29/00; G01N 29/04; G01N 29/06; G01N 29/0645; G01N 29/0654;
(Continued)

(56) References Cited

U.S. PATENT DOCUMENTS

| | | |
|---|---|---|
| 4,989,143 A | 1/1991 | O'Donnell et al. |
| 5,014,712 A | 5/1991 | O'Donnell et al. |

(Continued)

FOREIGN PATENT DOCUMENTS

| | | | | |
|---|---|---|---|---|
| CN | 115280182 | 11/2022 | | |
| DE | 102012025535 A1 * | 6/2014 | ......... | G01N 29/0645 |

(Continued)

OTHER PUBLICATIONS

Machine translation of DE-102012025535-A1 (Year: 2014).*
(Continued)

*Primary Examiner* — Nguyen Q. Ha
(74) *Attorney, Agent, or Firm* — Schwegman Lundberg & Woessner, P.A.

(57) ABSTRACT

A phase-based approach can be used for one or more of acquisition, storage, or subsequent analysis, e.g., A-scan reconstruction or Total Focusing Method imaging, in support of acoustic inspection. For example, binarization or other quantization technique can be used to compress a data volume associated with time-series signal acquisition. A representation of phase information from the time-series signal can be generated, such as by processing the binarized or otherwise quantized time-series signal. Using the representation of the phase information, a phase summation technique can be used to perform one or more of A-scan reconstruction, such as for pulse-echo A-scan inspection, or a TFM imaging technique can be used, as illustrative examples. In such a phase summation approach, time-series representations of phase data can be summed, such as where (Continued)

each time-series can be delayed (or phase rotated) by an appropriate delay value and then aggregated.

25 Claims, 19 Drawing Sheets

(52) U.S. Cl.
CPC ... *G01N 29/0645* (2013.01); *G01N 2291/044* (2013.01); *G01N 2291/106* (2013.01)

(58) Field of Classification Search
CPC ...... G01N 29/07; G01N 29/075; G01N 29/26; G01N 29/262
See application file for complete search history.

(56) References Cited

U.S. PATENT DOCUMENTS

| | | | |
|---|---|---|---|
| 9,157,895 | B2 | 10/2015 | Oberdoerfer et al. |
| 9,513,372 | B2* | 12/2016 | Valero ................... G01V 1/48 |
| 9,700,280 | B2 | 7/2017 | Courtney et al. |
| 10,191,478 | B2 | 1/2019 | Georgeson et al. |
| 10,444,333 | B2 | 10/2019 | Bini |
| 2012/0095346 | A1 | 4/2012 | Yoshizawa et al. |
| 2014/0030715 | A1 | 1/2014 | Cheng et al. |
| 2014/0238136 | A1 | 8/2014 | Ten Grotenhuis et al. |
| 2015/0141831 | A1 | 5/2015 | Yamamoto |
| 2017/0184716 | A1 | 6/2017 | Bini |
| 2017/0219704 | A1 | 8/2017 | Call et al. |
| 2017/0284972 | A1 | 10/2017 | Lepage et al. |
| 2019/0021697 | A1 | 1/2019 | Specht et al. |
| 2020/0284902 | A1 | 9/2020 | Kruse |
| 2021/0048413 | A1* | 2/2021 | Chinta ................. G01N 29/069 |

FOREIGN PATENT DOCUMENTS

| | | |
|---|---|---|
| JP | 2014030715 | 2/2014 |
| WO | 2010018282 | 2/2010 |
| WO | 2013168414 | 11/2013 |
| WO | WO-2021168565 A1 | 9/2021 |
| WO | 2022178624 | 9/2022 |

OTHER PUBLICATIONS

"International Application Serial No. PCT/CA2021/050222, International Search Report mailed May 4, 2021", 3 pgs.
"International Application Serial No. PCT/CA2021/050222, Written Opinion mailed may 4, 2021", 8 pgs.
Isla, Julio, et al., "Simultaneous transmission and reception on all elements of an array: binary code excitation", Proceedings of the Royal Society A: Mathematical, Physical and Engineering Sciences. vol. 475, [Online]. Retrieved from the Internet: <URL: https://royalsocietypublishing.org/doi/10.1098/rspa.2018.0831>, (2019), 23 pgs.
Lesage, J C, et al., "Phase coherence total focusing method for enhancement of small omni-directional scatterers and suppression of geometric reflectors: Application to near-surface crack sizing and detection of high temperature hydrogen attack", "Preprint submitted to NDT & E International", (Jul. 2020), 14 pgs.
Martinez-Graullera, Oscar, et al., "A New Beamforming Process Based on the Phase Dispersion Analysis", AIP Conference Proceedings 1433, pp. 185-188, (2012), 5 pgs.
Zhang, Haiyan, et al., "Instantaneous Phase Coherence Imaging for Near-Field Defects by Ultrasonic Phased Array Inspection", Sensors 20, 775, (2020), 12 pgs.
"European Application Serial No. 21760499.0, Communication Pursuant to Article 94(3) EPC mailed Jul. 18, 2024", 7 pgs.
"European Application Serial No. 21760499.0, Response filed Feb. 19, 2024 to Extended European Search Report mailed Jul. 26, 2023", 10 pgs.
"Canadian Application Serial No. 3, 175,548, Response filed Feb. 28, 2024 to Office Action mailed Oct. 31, 2023", 14 pgs.
"Japanese Application Serial No. 2022-552313, Notification of Reasons for Refusal mailed Mar. 4, 2024", W English Translation, 13 pgs.
"Japanese Application Serial No. 2022-552313, Response filed Jun. 4, 2024 to Notification of Reasons for Refusal mailed Mar. 4, 2024", W English Claims, 11 pgs.
"Japanese Application Serial No. 2022-552313, Notification of Reasons for Refusal mailed Sep. 4, 2023", w English Translation, 6 pgs.
"Canadian Application Serial No. 3, 175,548, Office Action mailed Oct. 31, 2023", 7 pgs.
"Japanese Application Serial No. 2022-552313, Response filed Dec. 4, 2023 to Notification of Reasons for Refusal mailed Sep. 4, 2023", w current English claims, 9 pgs.
Camacho, J, "Phase Coherence Imaging: Principles, applications and current developments", Proc. Mtgs. Acoust. 38, 055012, [Online]. Retrieved from the Internet: URL: https: asa.scitation.org doi pdf 10.1121 2.0001201, (2019), 7 pgs.
Le Duff, Alain, "Phase Coherence Imaging for Flaw Detection", Evident. White Paper, (Sep. 26, 2022), 12 pgs.
"International Application Serial No. PCT CA2022 050217, International Search Report mailed May 24, 2022", 4 pgs.
"International Application Serial No. PCT CA2022 050217, Written Opinion mailed May 24, 2022", 7 pgs.
"European Application Serial No. 21760499.0, Extended European Search Report mailed Jul. 26, 2023", 10 pgs.
Ferin, Guillaume, "Smart Autonomous wireless acoustic sensors for aeronautical SHM applications", IEEE International Ultrasonics Symposium Proceedings, (2015), 4 pgs.
Isla, Julio, "Simulataneous Transmission and Reception on All Elements of an Array: Binary Code Excitation", Proc. R. Soc. A, 475, [Online]. Retrieved from the Internet: URL: http: dx.doi.org 10.1098 rspa.2018.0831, (2019), 1-23.
Isla, Julio, "The Use of Binary Quantization for the Acquisition of Low SNR Ultrasonic Signals: A Study of the Input Dynamic Range", IEEE Transactions on Ultrasonics, Ferroelectrics, and Frequency Control, vol. 63, No. 9, (Sep. 2016), 1474-1482.
Nelson, L. J, "Ply-orientation measurements in composites using structure-tensor analysis of volumetric ultrasonic data", Composites Part A, vol. 104, (2018), 108-119.
Ricci, Marco, "Exploiting Pseudorandom Sequences to Enhance Noise Immunity for Air-Coupled Ultrasonic Nondestructive Testing", EEE Transactions on Instrumentation and Measurement, vol. 61, No. 11, (Nov. 2012), 2905-2915.

\* cited by examiner

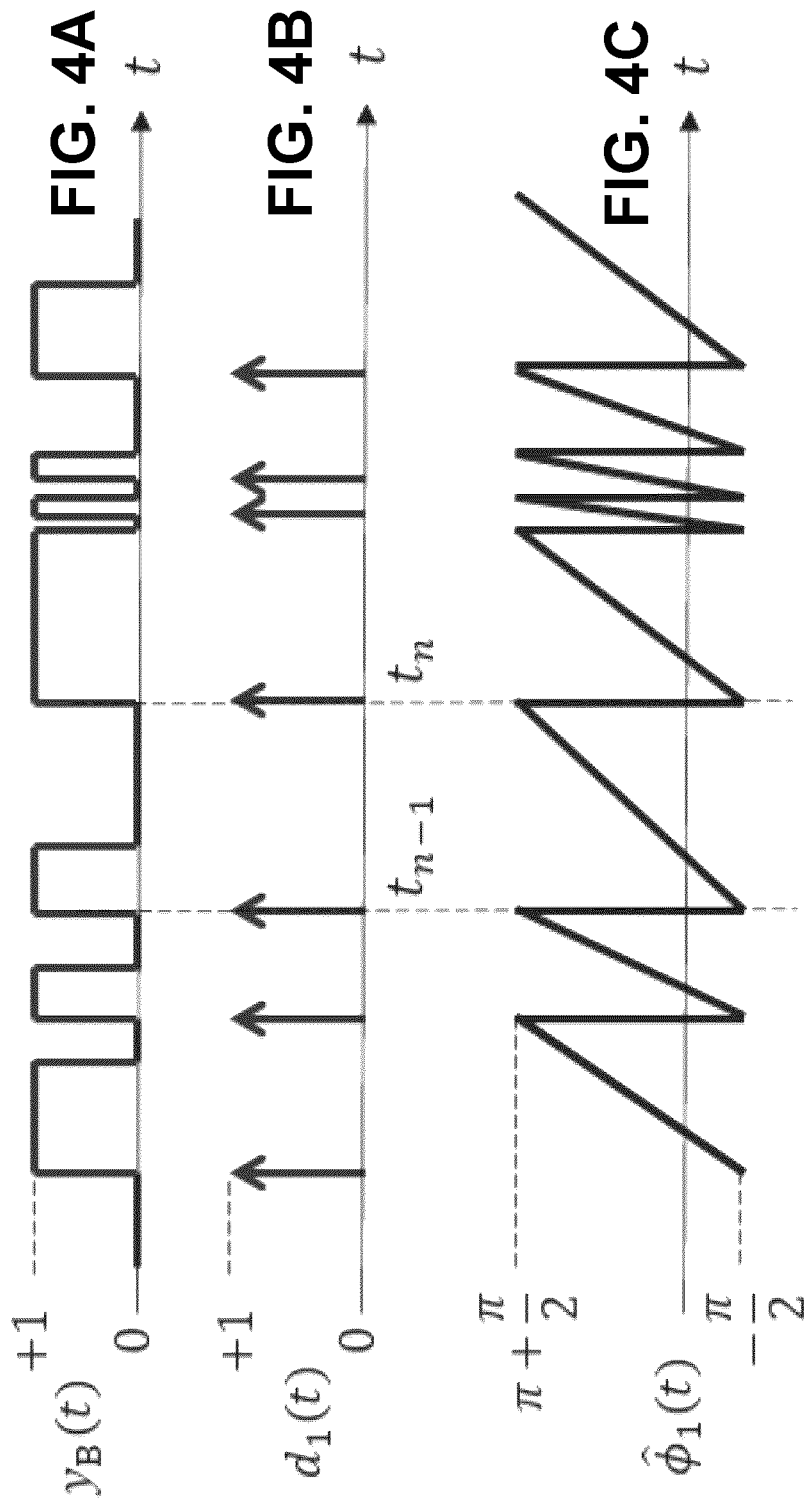

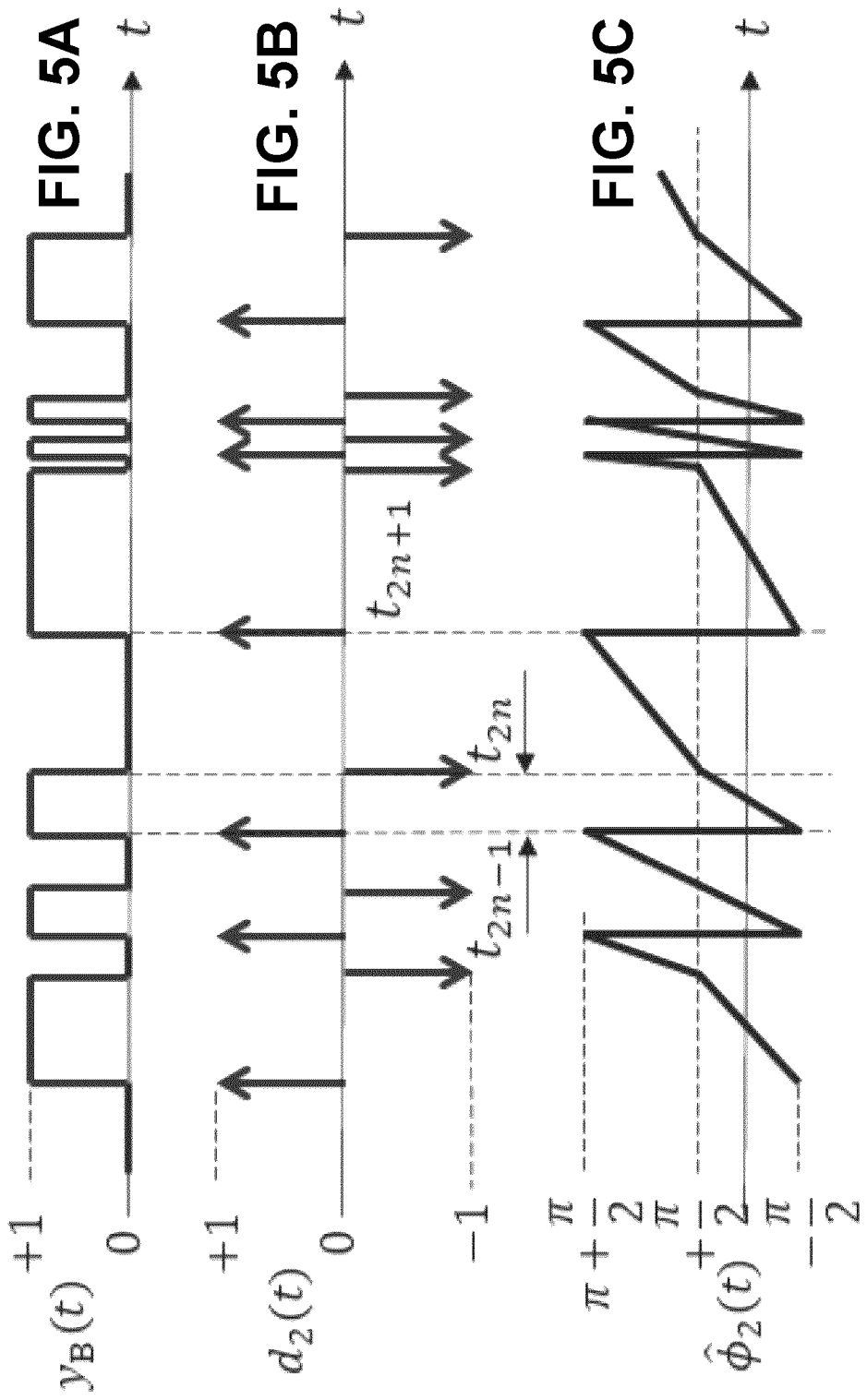

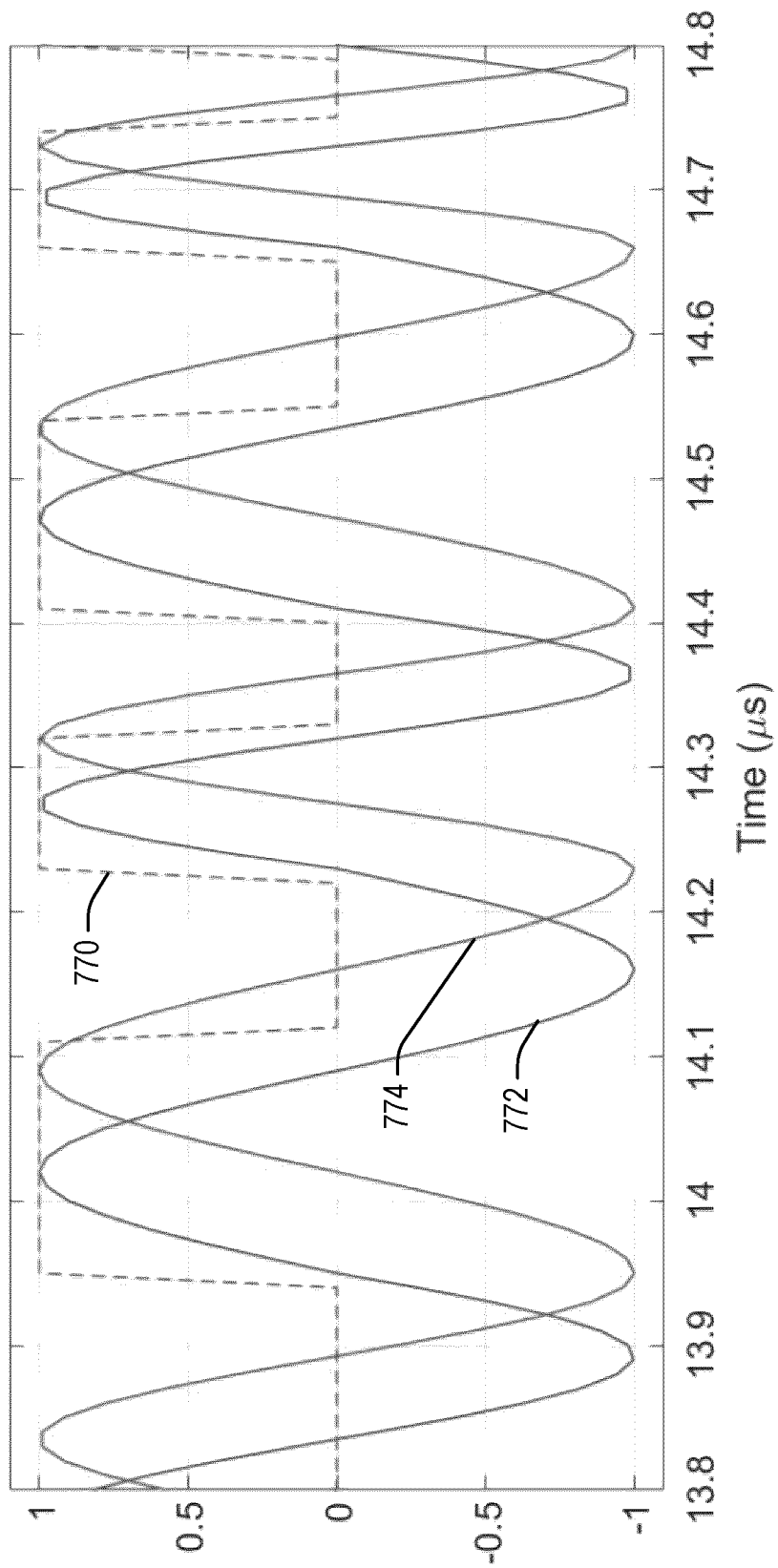

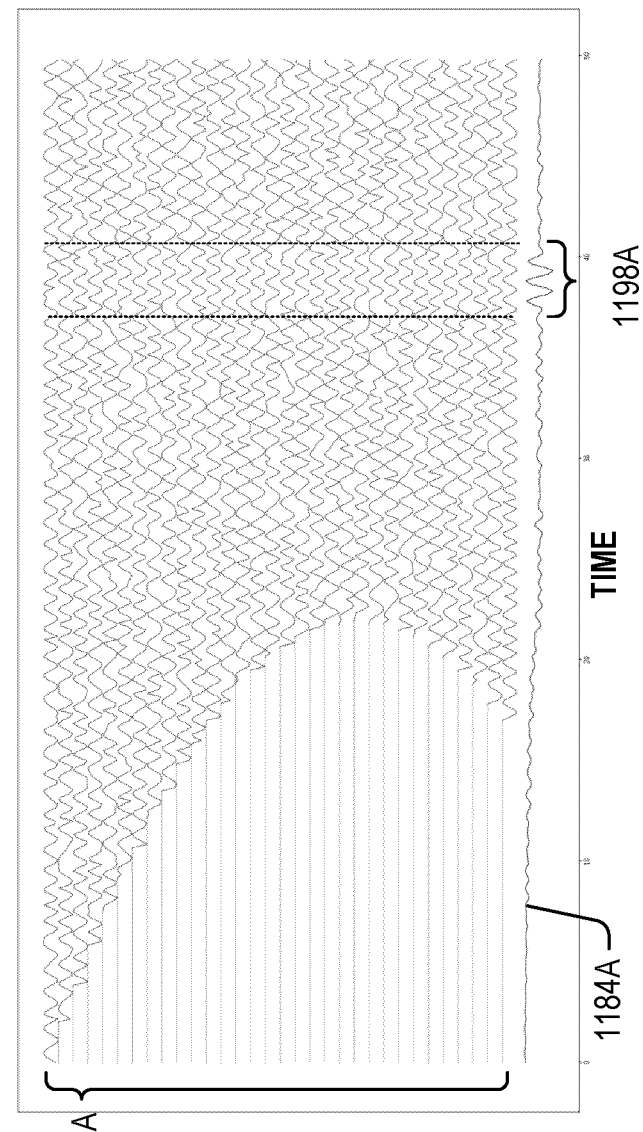
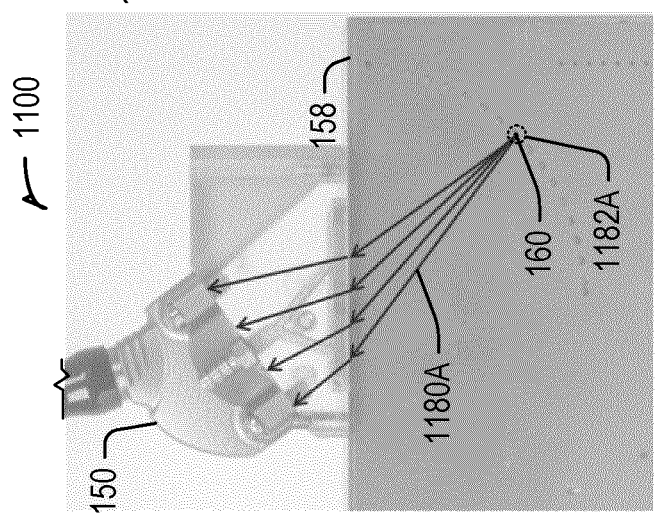
FIG. 8A
FIG. 8B

PHASE-BASED APPROACH FOR ULTRASONIC INSPECTION

CLAIM OF PRIORITY

This patent application is a U.S. National Stage Filing under 35 U.S.C. § 371 from International Application No. PCT/CA2021/050222, titled "PHASE-BASED APPROACH FOR ULTRASONIC INSPECTION," filed on Feb. 25, 2021; and published as WO2021/168565 on Sep. 2, 2021, which claims the benefit of priority of each of (1) Painchaud-April et al., U.S. Provisional Patent Application Ser. No. 62/983,172, titled "PHASE-BASED APPROACH FOR ULTRASONIC INSPECTION," filed on Feb. 28, 2020; and (2) Painchaud-April et al., U.S. Provisional Patent Application Ser. No. 63/087,521, titled "PHASEBASED APPROACH FOR ULTRASONIC INSPECTION," filed on Oct. 5, 2020, the benefit of priority of each is hereby claimed herein, and which applications and publications are hereby incorporated by reference herein in their respective entireties.

FIELD OF THE DISCLOSURE

This document pertains generally, but not by way of limitation, to non-destructive evaluation, and more particularly, to apparatus and techniques for ultrasonic inspection using acquired phase data.

BACKGROUND

Various inspection techniques can be used to image or otherwise analyze structures without damaging such structures. For example, one or more of x-ray inspection, eddy current inspection, or acoustic (e.g., ultrasonic) inspection can be used to obtain data for imaging of features on or within a test specimen. For example, acoustic imaging can be performed using an array of ultrasound transducer elements, such as to image a region of interest within a test specimen.

SUMMARY OF THE DISCLOSURE

Acoustic testing, such as ultrasound-based inspection, can include focusing or beam-forming techniques to aid in construction of data plots or images representing a region of interest within the test specimen. Use of an array of ultrasound transducer elements can include use of a phased-array beamforming approach and can be referred to as Phased Array Ultrasound Testing (PAUT). For example, a delay-and-sum beamforming technique can be used such as including coherently summing time-domain representations of received acoustic signals from respective transducer elements or apertures. In another approach, a Total Focusing Method (TFM) technique can be used where one or more elements in an array (or apertures defined by such elements) are used to transmit an acoustic pulse and other elements are used to receive scattered or reflected acoustic energy, and a matrix is constructed of time-series (e.g., A-Scan) representations corresponding to a sequence of transmit-receive cycles in which the transmissions are occurring from different elements (or corresponding apertures) in the array. Such a TFM approach where A-scan data is obtained for each element in an array (or each defined aperture) can be referred to as a "full matrix capture" (FMC) technique.

The present inventors have recognized, among other things, that capturing time-series A-scan data either for PAUT or TFM applications can involve generating considerable volumes of data. For example, A-scan time series data can be obtained through analog-to-digital conversion, such as having a corresponding amplitude resolution (e.g., 8-bit or 12-bit resolution) and time resolution (e.g., corresponding to a sample rate in excess of tens or hundreds of megasamples per second). Such "full" amplitude and time resolution can result in gigabits of time-series data for each received A-scan record for later processing as full-bandwidth and full-resolution analytic representations of such signals. Such volumes of data may be cumbersome to transfer between devices or to store. Such a volume of data may otherwise practically limit a count of transducer elements or aperture elements used for performing acoustic testing. To address such technical challenges, the present inventors have recognized, among other things, that a phase-based approach can be used for one or more of acquisition, storage, or subsequent analysis (e.g., A-scan reconstruction or TFM imaging) in support of acoustic inspection. For example, the present subject matter can include use of a binarization or other quantization technique to compress a data volume associated with time-series signal (e.g., A-scan) acquisition. A representation of phase information from the time-series signal can be generated, such as by processing the binarized or otherwise quantized time-series signal.

For example, temporal data indicative of edge transitions within the binarized data can be one or more of stored or transmitted for later use in construction of a time-domain representation of an instantaneous phase signal corresponding to an instantaneous phase of the original time-series A-scan signal. Such temporal data indicative of edge transitions can represent a compressed (e.g., lesser data volume) representation of the acquired time-series data as compared to a full analytic representation. Such reduction in data transfer burden can facilitate a variety of enhancements to acoustic testing protocols and apparatus, such as, for example, facilitating one or more of simplified acoustic transceiver front-end configuration (e.g., relaxing specifications relating to analog-to-digital conversion, particularly amplitude resolution), higher channel counts, faster acquisition, or novel inspection system topologies, as compared to other approaches. As an illustration, if a specified data transfer rate (e.g., "bandwidth") is available, use of phase-based techniques can allow a higher channel count or acquisition rate (e.g., "frame rate") for the same bandwidth as compared to a generally-available PAUT or TFM approach involving full analytic signals including amplitude and phase information.

Regardless of whether a binarized approach is used to represent phase information, a phase-based approach as described herein can include use of a phase summation technique where the amplitude information from an original time-series acquisition is not required. Such a phase summation technique can be used to perform one or more of A-scan reconstruction (e.g., for pulse-echo A-scan inspection), or TFM imaging, as illustrative examples. In such a phase summation approach, time-series representations of phase data can be summed, such as where each time-series can be delayed (or phase rotated) by an appropriate delay value and then aggregated (e.g., analytically summed on a sample-by-sample basis). The time-series phase data can include reconstructions of instantaneous phase signals as mentioned above, such as recovered or otherwise constructed from a compressed representation of acquired time-series phase information.

The present inventors have recognized, among other things that, for example, at a specified focal location or plurality of focal locations, features on or within a test specimen, when insonified, can scatter or reflect acoustic energy to produce corresponding pulse echo signals at transducers in an acoustic probe array in a manner where the pulse echo signals have coherent phase, accounting for differences in arrival time. Such phase coherence allows aggregation (e.g., summing) of time-domain phase signal representations without requiring use of the amplitude information from the originally-acquired A-scan pulse-echo signals. As mentioned above, a 1-bit sampling approach can be used, such as to produce what can be referred to as "amplitude-free" representations of received time-domain echo signals, for later use in such a phase-summation approach. While binarization is not required in order to perform A-scan summation or imaging using phase data, use of binarization in concert with phase-summation can enhance transducer array count or simplify receive channel architecture, or both, among other things. For example, a greater count of transducers or apertures can be used for acquisition while maintaining or reducing data transfer bandwidth. In another example, the receive channel architecture can be simplified, such as reducing an amplitude bit-resolution during sampling or even eliminating multi-bit analog-to-digital conversion.

In an example, a system or apparatus can implement a technique, such as a machine-implemented method, for acoustic evaluation of a target, the method comprising generating respective acoustic transmission events via selected transmitting ones of a plurality of electro-acoustic transducers, and in response to the respective acoustic transmission events, receiving respective acoustic echo signals from other receiving ones of the plurality of electroacoustic transducers. The method can include quantizing the respective received acoustic echo signals and constructing a time-domain representation of an instantaneous phase signal from a representation of at least one respective quantized acoustic echo signal.

In an example, the method can include quantizing the received acoustic echo signals using a first device, where the machine-implemented method comprises transmitting respective representations of the quantized received acoustic echo signals to a second device, and where the constructing the time-domain representation of the instantaneous phase signal is performed on the second device for use in constructing at least one of an A-Scan representation or an image.

In an example, the method can include that the representations of the quantized received acoustic echo signals comprise data indicative of time indices of edge transitions in binarized representations of the received acoustic echo signals. In an example, the method can include aggregating phase data from multiple quantized echo signals to generate at least one of an A-scan time series, a pixel value corresponding to a specified spatial location of the target, or a voxel value corresponding to the specified spatial location of the target. In an example, the generating the pixel or voxel value comprises performing a summation of respective received acoustic echo signals using a Total Focusing Method (TFM) technique applied to in-phase and quadrature time-domain representations of the phase data.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4A, FIG. 4B, and FIG. 4C collectively illustrate generally a first technique that can be used to construct a representation of an instantaneous phase signal (as shown in FIG. 4C) from a binarized representation of an acquired time-series (as shown in FIG. 4A), using data indicative of transitions (e.g., rising edges) in the binarized time-series (as shown in FIG. 4B).

FIG. 5A, FIG. 5B, and FIG. 5C collectively illustrate generally a second technique that can be used to construct a representation of an instantaneous phase signal (as shown in FIG. 5C) from a binarized representation of an acquired time-series (as shown in FIG. 5A), using data indicative of transitions (e.g., rising and falling edges) in the binarized time-series (as shown in FIG. 5B).

FIG. 7 illustrates generally an illustrative example of in-phase and quadrature signals, such as can be provided using the signal chain shown in FIG. 6A, along with a corresponding binarized representation of an acquired time-series corresponding to an acquired A-scan signal.

FIG. 8A illustrates generally an acoustic inspection configuration including an acoustic probe assembly and a target, along with a representation of a focal region used for reconstruction of an A-scan using a phase-based summation approach as shown illustratively in FIG. 8B.

FIG. 8B illustrates generally an illustrative example of a plurality of acquired phase signals that have been respectively delayed to provide focus at the region shown in FIG. 8A, and a corresponding summation of such signals according to a phase-based summation approach.

DETAILED DESCRIPTION

Figure 1:
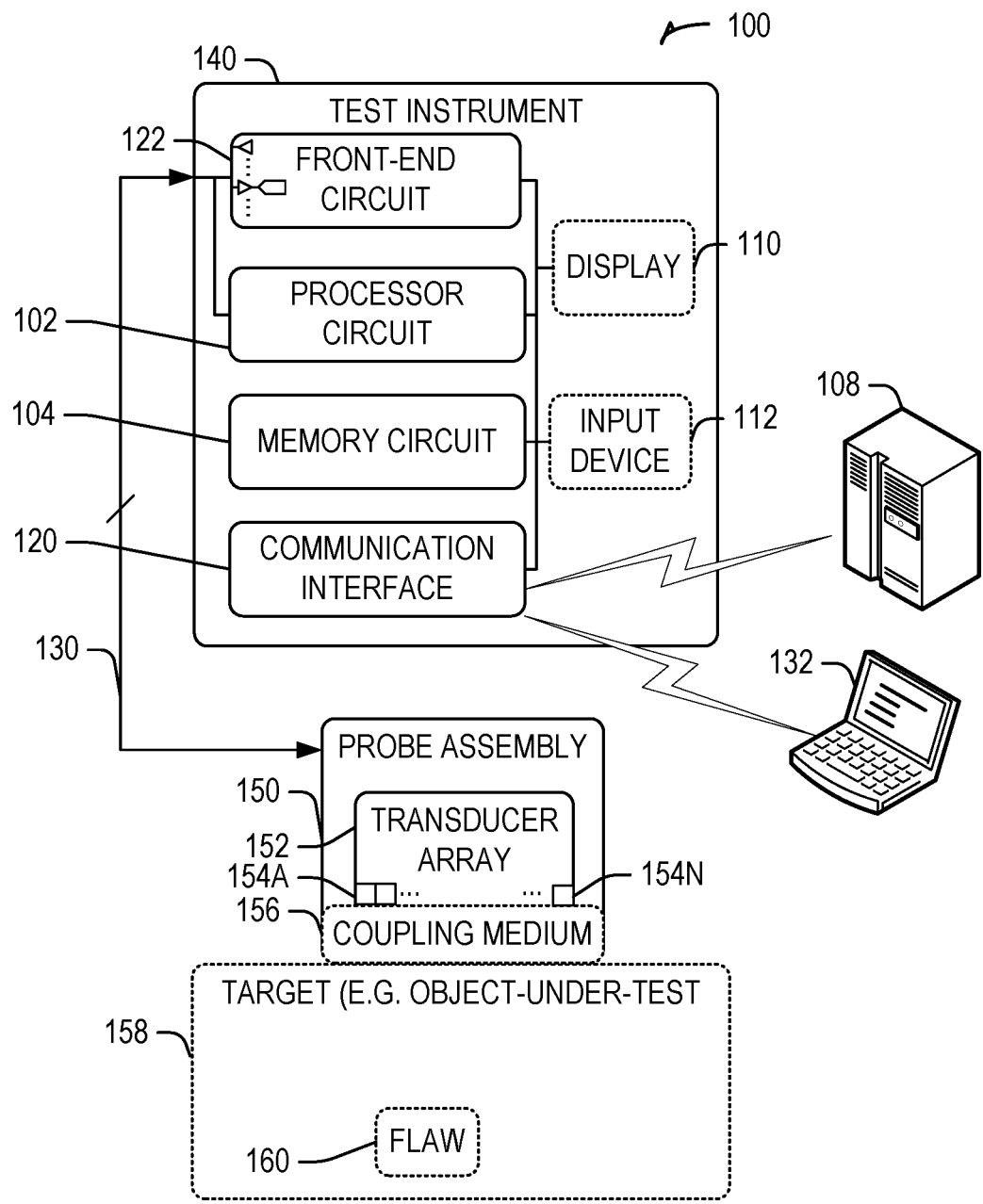
FIG. 1 illustrates generally an example comprising an acoustic inspection system, such as can be used to perform at least a portion one or more techniques as shown and described herein.

In acoustic inspection (e.g., ultrasound inspection), as mentioned above, the present inventors have recognized, among other things, that capturing time-series A-scan data for PAUT or TFM applications can involve generating considerable volumes of data. To address various technical challenges, the present inventors have recognized, among other things, that a phase-based approach can be used for one or more of acquisition, storage, or subsequent analysis (e.g., A-scan reconstruction or imaging) in support of acoustic inspection. Use of a phase-based approach can address other technical challenges as well. For example, a challenge can exist because pulse echo amplitude data obtained from an ultrasound transducer array can be affected by various factors, such as one or more of diffraction effects (from transmitter element, receiver element, or scatterers), transmission/reflection at interfaces having differing constitutive characteristics, geometric attenuation of signals, and absorption or frictional losses, as illustrative examples. The present inventors have recognized, among other things, that the factors mentioned above affect amplitude and are generally compensated by empirical measurements (e.g., using Time Correction Gain (TCG) and Angle Correction Gain (ACG), for example). Accordingly, if an analytical notation is used to refer to the received signal summation, the compensations mentioned above (TCG and ACG) affect the individual element amplitude terms ("$a_{qp}(r)$"), for a Q×P element array, where q and p represent element indices:

$$A(r) = \Sigma_{qp}^{QP} a_{qp}(r) e^{i\theta_{qp}(r)} \quad \text{(eqn. 1)}$$

In EQN. 1, A(r) represents a pixel or voxel value for a spatial location described by the vector, "r", and $a_{qp}$ represents an amplitude component for a corresponding transmit-receive pair at element indices q and p. Accordingly, to remedy such challenges, the present inventors have recognized, among other things, that such amplitude terms can be factored out of the summation process, leaving the phase-related coherence terms to be summed ("$e^{i\theta_{qp}(r)}$"):

$$\tilde{A}(r) = \Sigma_{qp}^{QP} e^{i\theta_{qp}(r)} \quad \text{(EQN. 2)}$$

By use of such factorization, factors influencing amplitude are suppressed (because such factors may influence terms that have now been moved "outside" the summation), while the phase-related terms (e.g., associated with scatterers or other features of interest) remain. As mentioned elsewhere herein, individual time-domain representations of instantaneous phase signals can be acquired, compressed, and reconstructed. Acquisition can be performed using a front-end configuration having a reduced dynamic range as compared to existing approaches that use amplitude and phase information. A compressed representation of the instantaneous received phase signals allows efficient transfer of acquired time-domain data between devices or functional blocks within a testing or imaging system, including wired or wireless transmission of such data to other devices for further analysis, processing, or storage. Re-construction of representations of instantaneous phase signals corresponding to acquired echo signals facilitates A-scan reconstruction or imaging (e.g., TFM imaging).

FIG. 1 illustrates generally an example comprising an acoustic inspection system 100, such as can be used to perform at least a portion one or more techniques as shown and described herein. The inspection system 100 can include a test instrument 140, such as a hand-held or portable assembly. The test instrument 140 can be electrically coupled to a probe assembly, such as using a multi-conductor interconnect 130. The probe assembly 150 can include one or more electroacoustic transducers, such as a transducer array 152 including respective transducers 154A through 154N. The transducers array can follow a linear or curved contour or can include an array of elements extending in two axes, such as providing a matrix of transducer elements. The elements need not be square in footprint or arranged along a straight-line axis. Element size and pitch can be varied according to the inspection application.

A modular probe assembly 150 configuration can be used, such as to allow a test instrument 140 to be used with various different probe assemblies 150. Generally, the transducer array 152 includes piezoelectric transducers, such as can be acoustically coupled to a target 158 (e.g., a test specimen or "object-under-test") through a coupling medium 156. The coupling medium can include a fluid or gel or a solid membrane (e.g., an elastomer or other polymer material), or a combination of fluid, gel, or solid structures. For example, an acoustic transducer assembly can include a transducer array coupled to a wedge structure comprising a rigid thermoset polymer having known acoustic propagation characteristics (for example, Rexolite® available from C-Lec Plastics Inc.), and water can be injected between the wedge and the structure under test as a coupling medium 156 during testing.

The test instrument 140 can include digital and analog circuitry, such as a front-end-circuit 122 including one or more transmit signal chains, receive signal chains, or switching circuitry (e.g., transmit/receive switching circuitry). The transmit signal chain can include amplifier and filter circuitry, such as to provide transmit pulses for delivery through an interconnect 130 to a probe assembly 150 for insonification of the target 158, such as to image or otherwise detect a flaw 160 on or within the target 158 structure by receiving scattered or reflected acoustic energy elicited in response to the insonification.

While FIG. 1 shows a single probe assembly 150 and a single transducer array 152, other configurations can be used, such as multiple probe assemblies connected to a single test instrument 140, or multiple transducer arrays 152 used with a single or multiple probe assemblies 150 for tandem inspection. Similarly, a test protocol can be performed using coordination between multiple test instruments 140, such as in response to an overall test scheme established from a master test instrument 140, or established by another remote system such as a compute facility 108 or general purpose computing device such as a laptop 132, tablet, smart-phone, desktop computer, or the like. The test scheme may be established according to a published standard or regulatory requirement and may be performed upon initial fabrication or on a recurring basis for ongoing surveillance, as illustrative examples.

The receive signal chain of the front-end circuit 122 can include one or more filters or amplifier circuits, along with an analog-to-digital conversion facility, such as to digitize echo signals received using the probe assembly 150. Digitization can be performed coherently, such as to provide multiple channels of digitized data aligned or referenced to each other in time or phase. The front-end circuit can be coupled to and controlled by one or more processor circuits, such as a processor circuit 102 included as a portion of the test instrument 140. The processor circuit can be coupled to a memory circuit, such as to execute instructions that cause the test instrument 140 to perform one or more of acoustic transmission, acoustic acquisition, processing, or storage of data relating to an acoustic inspection, or to otherwise perform techniques as shown and described herein. The test instrument 140 can be communicatively coupled to other portions of the system 100, such as using a wired or wireless communication interface 120.

For example, performance of one or more techniques as shown and described herein can be accomplished on-board the test instrument 140 or using other processing or storage facilities such as using a compute facility 108 or a general-purpose computing device such as a laptop 132, tablet, smart-phone, desktop computer, or the like. For example, processing tasks that would be undesirably slow if performed on-board the test instrument 140 or beyond the capabilities of the test instrument 140 can be performed remotely (e.g., on a separate system), such as in response to a request from the test instrument 140. Similarly, storage of imaging data or intermediate data such as A-scan matrices of time-series data or compressed phase data, for example, can be accomplished using remote facilities communicatively coupled to the test instrument 140. The test instrument can include a display 110, such as for presentation of configuration information or results, and an input device 112 such as including one or more of a keyboard, trackball, function keys or soft keys, mouse-interface, touch-screen, stylus, or the like, for receiving operator commands, configuration information, or responses to queries.

Figure 2A:
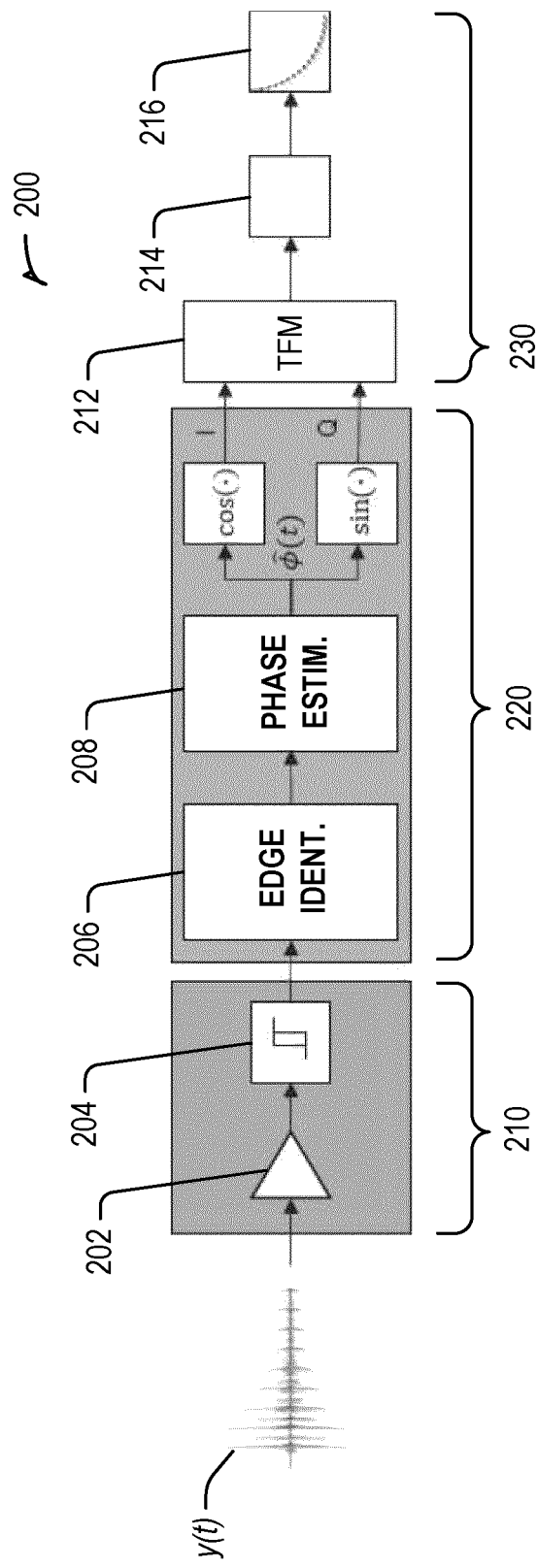
FIG. 2A illustrates generally an example comprising a receiver signal chain such as can be included as a portion of an acoustic inspection system, such as can be used to perform at least a portion of one or more techniques as shown and described herein.

FIG. 2A illustrates generally an example comprising a receiver signal chain 200 such as can be included as a portion of an acoustic inspection system 100, such as can be used to perform at least a portion of one or more techniques as shown and described herein. The signal chain 200 of FIG. 2 can be used to perform a phase-summation imaging technique, such as shown and described according to various examples in this document. Generally, a signal chain 200 as shown in FIG. 2 can receive a time-domain pulse echo y(t), such as received by a transducer in an acoustic transducer array used for PAUT or TFM imaging. An amplifier 202 can be included as a portion of an analog front-end circuit 210. The amplifier can be coupled to an analog-to-digital converter. For example, for single-bit (i.e. "1-bit") quantizing or "binarization" of the received pulse echo signal, "y(t)," a comparator circuit 204 can be used. A digital representation of the pulse echo signal can be provided to a digital block 220 of the receive signal chain 200, such as to perform edge identification at 206 (e.g., to identify temporal locations of edge transitions in the digital representation of the pulse echo signal. At 208, a phase estimation approach can be implemented, such as corresponding to the first or second techniques described herein at FIG. 4A, FIG. 4B, and FIG. 4C or FIG. 5A, FIG. 5B, or FIG. 5C, for example. A resulting estimate (e.g., "reconstruction") of the instantaneous phase signal, $\phi(t)$, can be processed, such as by a Hilbert transform or other technique to provide in-phase, "I," and quadrature, "Q" time-domain signals. The time-domain signals, generated from the estimated instantaneous phase signal can be used to perform imaging via TFM at 212, in a manner similar to generally-available TFM imaging, but without requiring the full A-scan amplitude data from the original acquired pulse echo signals such as represented by a group of signals similar to y(t) (e.g., the elementary A-scan pulse echo signals). At 214, further processing of the TFM image can be implemented, such as to perform one or more of gamma correction or spatial filtering, or to perform application of another convolution mask, to produce a TFM image at 216 based on the phase-summation technique.

The analog front-end circuit 210 of FIG. 2A can be replicated, such as to provide multiple channels corresponding to a count of elements in the transducer array, or a front-end circuit 210 can be shared or multiplexed for acquisition of pulse echo signals from multiple transducer elements, such as in a time-interleaved manner. As an illustrative example, the analog front-end circuit 210 can include a low noise amplifier with a 37 decibel (dB) (+74×) gain, such as using an LT1806 integrated circuit available from Analog Devices (Woburn, MA), which can provide a 325 MHz gain-bandwidth product, a 140 Volt-per-microsecond slew rate and a 85 milliamp output current. Binarization can be performed such as using an LT1719 integrated comparator circuit, also available from Analog Devices (Woburn, MA). The comparator circuit 204 can provide hysteresis, such as to suppress unwanted output transitions due to noise. The analog front-end circuit 210 or portions of the front-end circuit 210 can include a standby or shutdown capability, such as to enter a near-zero or zero current consumption mode when not being used for acquisition. In this manner, a portable or hand-held inspection instrument housing the front-end circuit 210 can be powered by batteries and can conserve operating energy to extend operating life between recharges or can support higher channel counts for the same battery longevity as compared to other approaches, as illustrative examples.

A portion or an entirety of processing performed in the digital block 220 need not be performed on the same physical device or instrument as is used for acquisition. For example, after binarization by the comparator circuit 204, a representation of the binarized pulse echo signal can be transmitted to another device or assembly for downstream processing. Similarly, an output from the edge identification at 206 can be referred to as a "compressed" representation of the phase data corresponding to the binarized pulse echo signal. The compressed representation can be transmitted to another device or assembly for downstream processing.

Figure 2B:
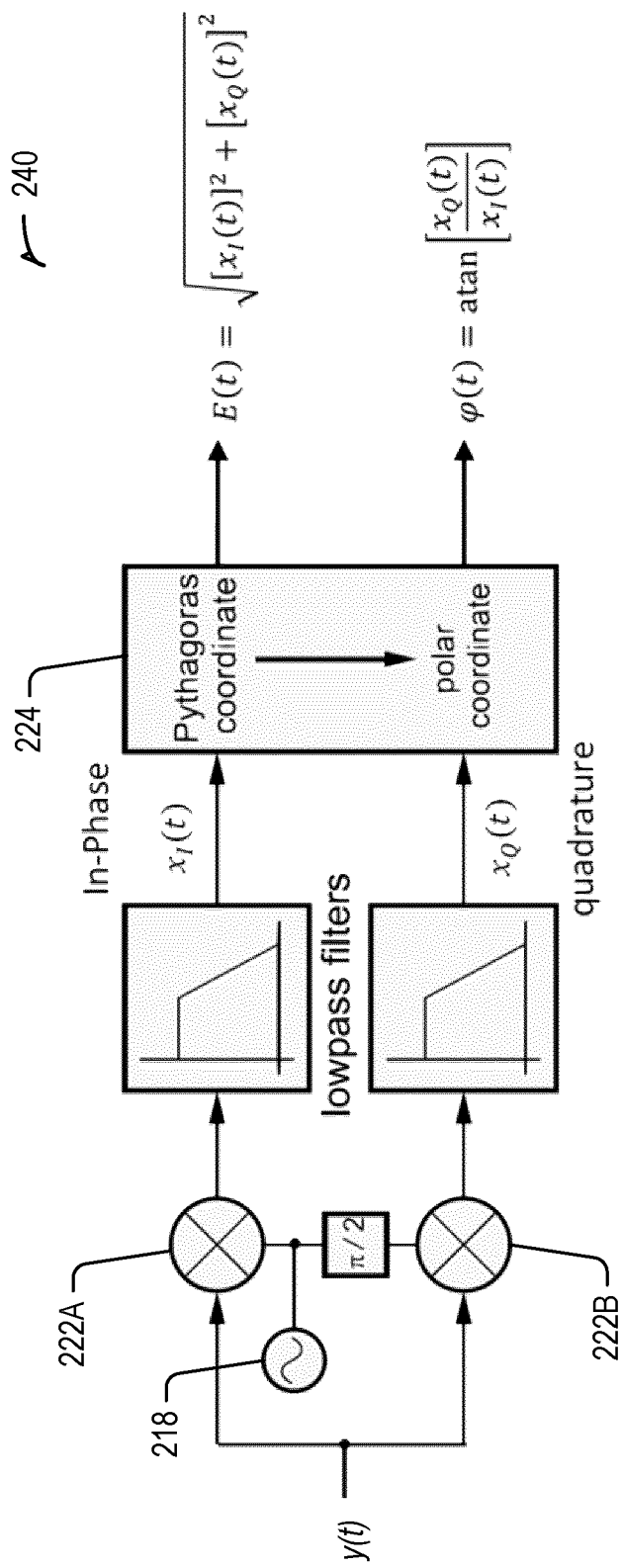
FIG. 2B illustrates generally another example comprising a receiver signal chain such as can be included as a portion of an acoustic inspection system, such as can be used to perform at least a portion of one or more techniques as shown and described herein.

FIG. 2B illustrates generally another example comprising a receiver signal chain 240 such as can be included as a portion of an acoustic inspection system, and that can be used to perform at least a portion of one or more techniques as shown and described herein. By contrast with the example of FIG. 2A, in FIG. 2B, a coherent receiver topology is used. A pulse echo signal, y(t), can be provided to respective mixer circuits 222A and 222B, such as using a local oscillator 218 to down-convert the pulse echo signal y(t) to a desire range of frequencies at or near a baseband frequency range. Unwanted harmonics or modulation products can be suppressed such as using lowpass filter circuits as shown. Resulting in-phase and quadrature signals can be processed at 224, either in the analog domain or via digitization and then digital processing (e.g., using CORDIC, a lookup table, or other technique), to provide a magnitude representation, E(t), and an instantaneous phase representation, $\hat{\phi}(t)$, corresponding to an estimate of the phase of the original A-scan signal, y(t). The instantaneous phase representation could be used for summed A-scan construction or TFM imaging, or could be compressed, transmitted, or stored, as in other examples in this document.

The examples of FIGS. 2A and 2B concern the receive circuitry and processing techniques that can be used with a phase-summation approach. The present inventors have also recognized, among other things, that the receiver topologies above can also facilitate use of a modified transmit scheme. For example, a transmit pulse amplitude can be reduced compared to other approaches because a dynamic range associated with use of a single-bit quantizing receive approach can be lessened as compared to a corresponding high-resolution amplitude sampling using multi-bit analog-to-digital conversion. Use of a lower transmit amplitude can facilitate higher channel counts and more compact transmit circuitry or transducer geometry, as illustrative enhancements as compared to generally-available approaches involving summed A-scan or TFM imaging where phase summation is not used.

Figure 3A:
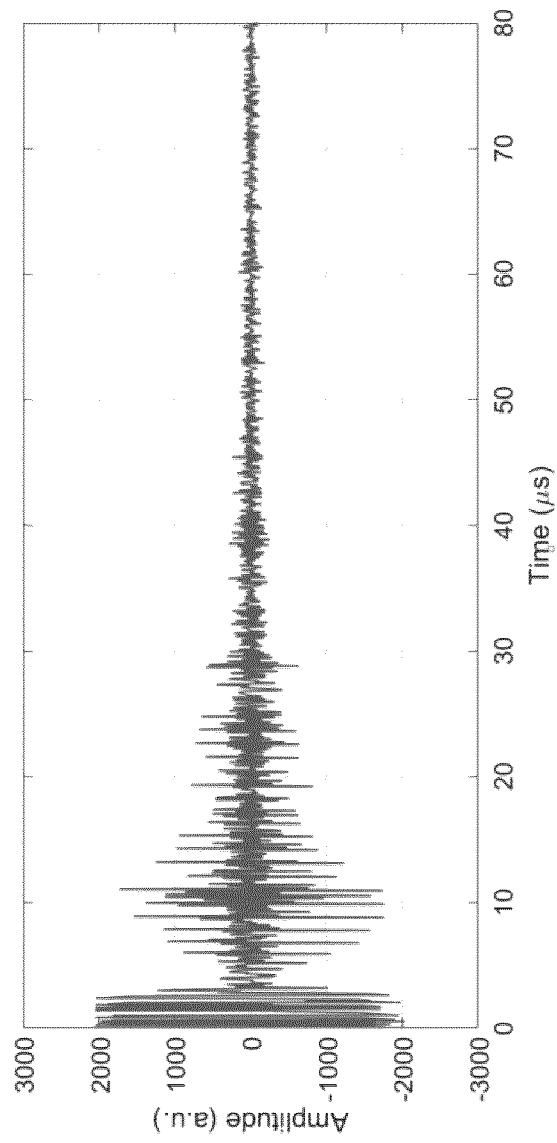
FIG. 3A illustrates generally an illustrative example of a "raw" time-series, such as corresponding to an acquired A-scan signal.
Figure 3B:
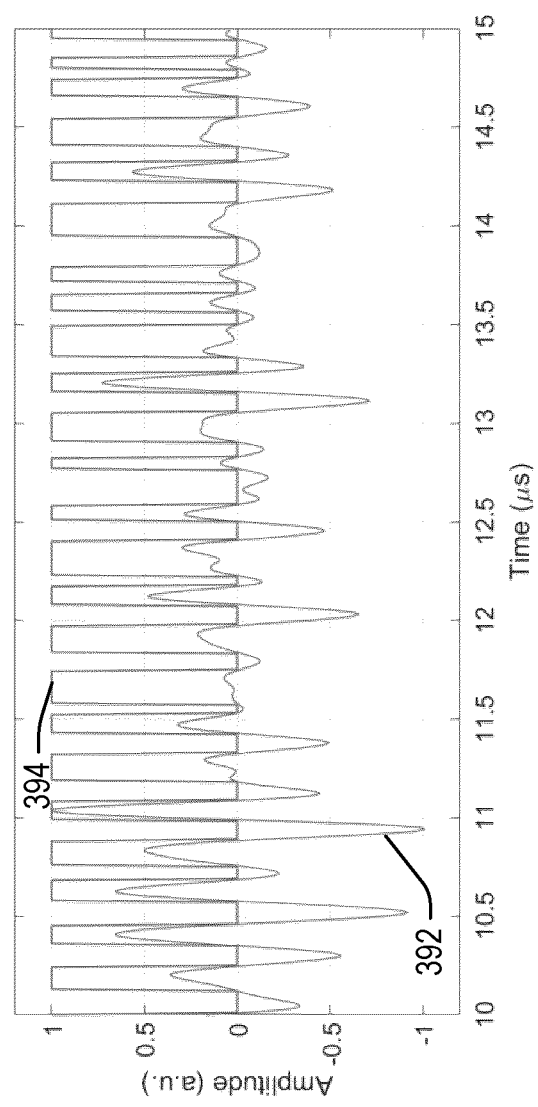
FIG. 3B illustrates generally an illustrative example of a normalized time-series and a corresponding binarized representation of the normalized time-series, such as representing an acquitted A-scan signal and a corresponding binarized representation thereof, corresponding to a portion of the time-series shown in FIG. 3A

FIG. 3A illustrates generally an illustrative example of a "raw" experimentally-obtained time-series, such as corresponding to a pulse echo (e.g., "A-scan") signal acquired without binarization. The amplitude is in arbitrary units, and the time series is not normalized in amplitude. FIG. 3B illustrates generally an illustrative example of a portion of a normalized time-series 392, such as corresponding to the time series of FIG. 3A, and a corresponding binarized representation 394 $y_B(t)$ of the normalized time-series y(t). As discussed elsewhere herein, a pulse echo time-domain signal such as the time-series 392 can be quantized, such as sampled using a single-bit quantizing approach. The binarized representation 394 is a simulation generated using the following analytical expression, where $y_B(t)=1$ when $y(t) > 0$ and $y_B(t)=0$ when $y(t) < 0$:

$$y_B(t) = \tfrac{1}{2} \cdot \{1 + \mathrm{sign}[y(t)]\} \quad \text{(EQN. 3)}$$

For y(t) values of exactly zero, the result can be assigned as zero, as an example, or as one, as another example. The amplitude of the binarized representation is normalized to values of zero or one, but could be scaled appropriately, gated, or otherwise conditioned to provide a voltage mode or current mode digital signal having desired logic-high and logic-low levels for downstream processing.

Figure 3C:
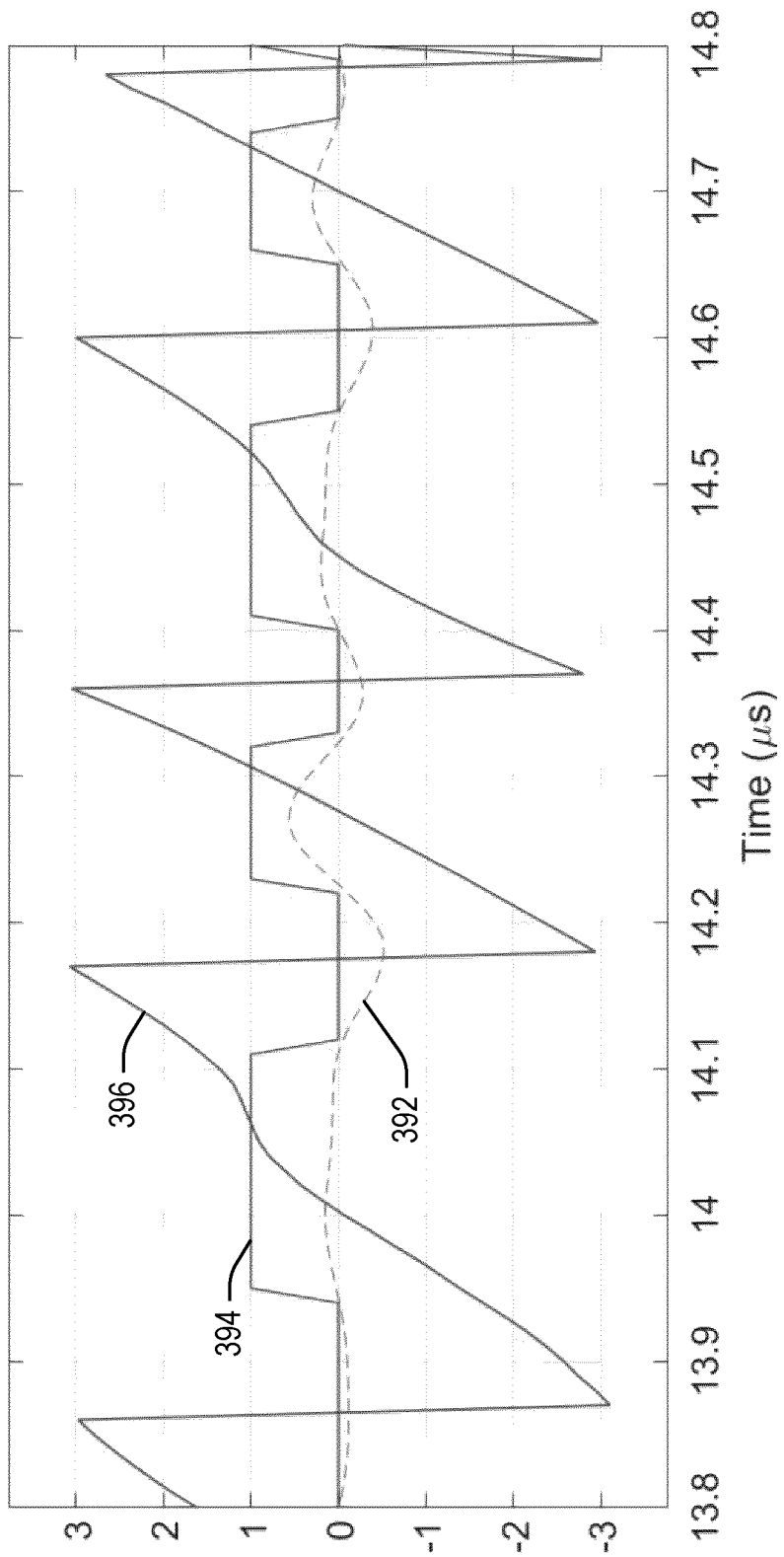
FIG. 3C illustrates generally an illustrative example of a portion of the normalized time-series of FIG. 3B, a corresponding binarized representation of the normalized time-series of FIG. 3B, and a corresponding instantaneous phase signal.

FIG. 3C illustrates generally an illustrative example of a portion of the normalized time-series 392 of FIG. 3B, a corresponding binarized representation 394 of the normalized time-series of FIG. 3B, and a corresponding instantaneous phase signal 396. The present inventors have recognized, among other things, that the instantaneous phase signal 396 exhibits a roughly piece-wise linear behavior during respective "pseudo" periods, where the periods are defined by roughly linear phase transitions between values of $-\pi$ radians and $+\pi$ radians. Such behavior exists in part because pulse echo signals are relatively narrowband signals with excursions around a center frequency. This piece-wise behavior facilitates use of the first or second phase construction techniques as discussed below. The use of the word "construction" can refer to "reconstruction" or "recovery" of phase data from a compressed representation of a time-domain instantaneous phase signal. Constructed representations of the time-domain instantaneous phase signals can then be used for summed A-scan construction, or TFM imaging, using summation of the time-domain phase signals. For example, time-domain representations of reconstructed instantaneous phase signals can be aggregated (e.g., coherently summed) comprising aggregating phase data from multiple quantized echo signals to generate at least one of an A-scan time series, a pixel value corresponding to a specified spatial location of the target, or a voxel value corresponding to the specified spatial location of a target such as test specimen.

FIG. 4A, FIG. 4B, and FIG. 4C collectively illustrate generally a first technique that can be used to construct a representation of an instantaneous phase signal (as shown in FIG. 4C) from a binarized representation of an acquired time-series (as shown in FIG. 4A), using data indicative of transitions (e.g., rising edges) in the binarized time-series (as shown in FIG. 4B). In the first technique, a binarized representation $y_B(t)$ of FIG. 4A can be processed, such as to detect temporal locations of rising edge transitions as shown in the Dirac distribution $d_r(t)$ in the simulation of FIG. 4B. Generally, an instantaneous phase can be modeled as a piece-wise linear approximation having phase that varies by $2\pi$ radians per pseudo-period between time indices defining adjacent rising edges in $y_B(t)$. In practical application, edges in $y_B(t)$ could be detected using a threshold comparator or digital signal processing of a digital representation of the binarized signal $y_B(t)$ such as using a finite difference technique to estimate a derivative of $y_B(t)$. The phase in FIG. 4C can be generated using the edge data from FIG. 4B and can model or otherwise represent an estimate of an "in-phase" component of the instantaneous phase of an analytic representation of the acquired pulse signal. For example, the phase estimate $\hat{\phi}_1(t)$ can be established to vary linearly (e.g., defining a slope) from a value of $-\pi/2$ radians at time $t_{n-1}$, corresponding to a first rising edge transition in FIG. 4A, to a value of $+\pi/2$ radiations at time $t_n$, corresponding to a second, adjacent rising edge transition in FIG. 4A, defining a segment in a piece-wise approximation. The phase estimate $\hat{\phi}_1(t)$ can be represented analytically for all pairs of adjacent rising edges, $t_n$ and $t_{n-1}$ as:

$$\hat{\phi}_1(t) = 2\pi \cdot \left( \frac{t - t_{n-1}}{t_n - t_{n-1}} \right) - \frac{\pi}{2} \mod 2\pi \quad \text{(EQN. 4)}$$

Figure 4D:
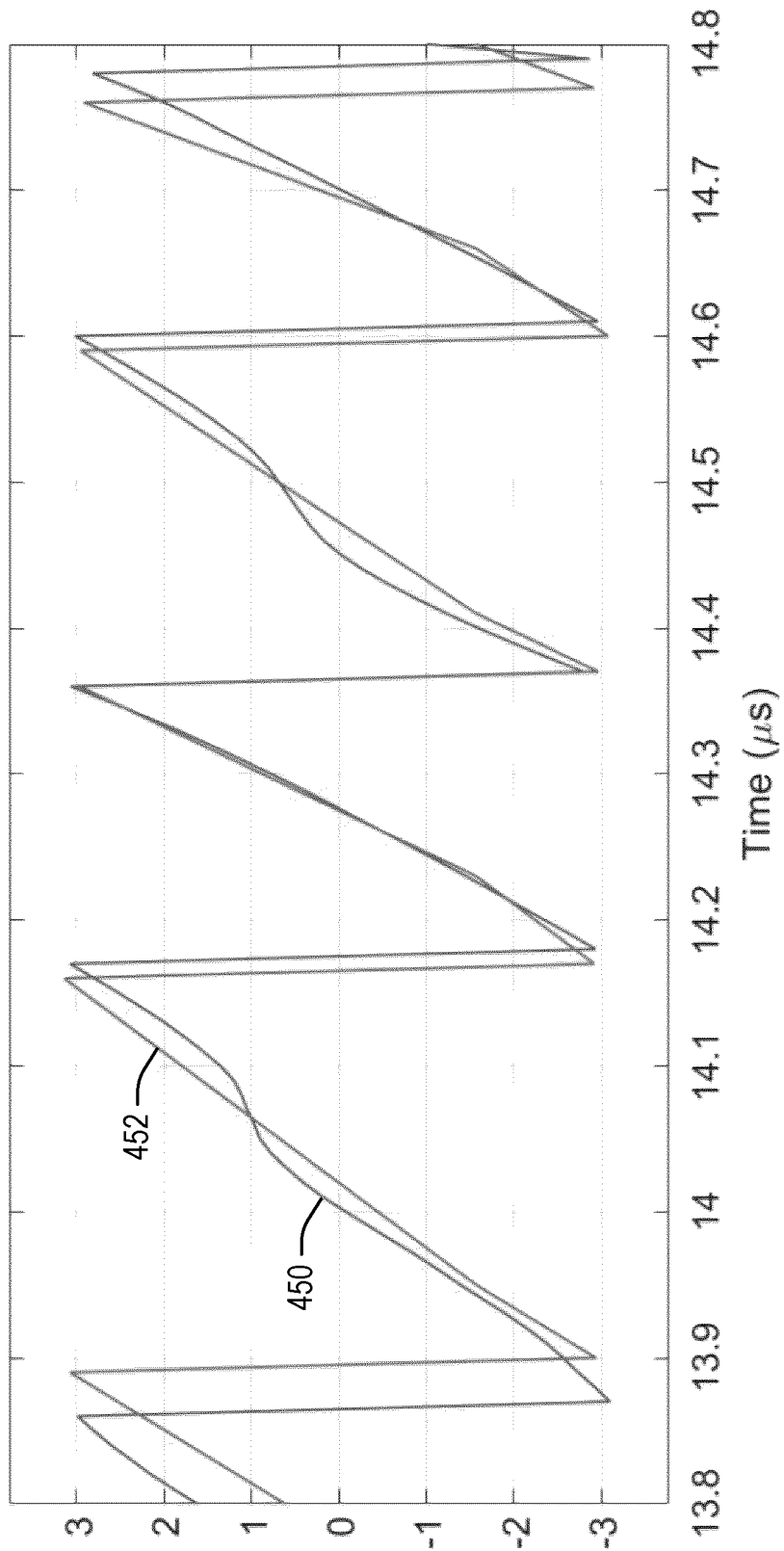
FIG. 4D illustrates generally a comparison between a representation of an instantaneous phase as constructed in FIG. 4C, as compared to the actual acquired instantaneous phase prior to binarization as shown in FIG. 3C.

FIG. 4D illustrates generally a comparison between a representation of an instantaneous phase 452, $\hat{\phi}_1(t)$, as constructed in FIG. 4C, as compared to the actual acquired instantaneous phase prior to binarization 450 as shown earlier in FIG. 3C. The recovered phase 452 reasonably tracks values of the instantaneous phase 450 and is therefore suitable for use in phase summation techniques such as summed A-scan construction or TFM imaging via phase summation. As noted elsewhere herein, temporal locations of edge transitions as shown in FIG. 4B can be used to encode the phase information in a highly compressed form for transmission, storage, or downstream processing, as compared to transferring, storing, or manipulating a full time series record corresponding to the pulse echo time-domain signal of FIG. 3A or the instantaneous phase 450 shown in FIG. 4D. As mentioned elsewhere, summed A-scan or TFM imaging techniques generally involve use of many such pulse echo time series records, so bandwidth or data volume savings have a multiplicative effect as transducer count or aperture count increases.

FIG. 5A, FIG. 5B, and FIG. 5C collectively illustrate generally a second technique that can be used to construct a representation of an instantaneous phase signal (as shown in FIG. 5C) from a binarized representation of an acquired time-series (as shown in FIG. 5A), using data indicative of transitions (e.g., edges) in the binarized time-series (as shown in FIG. 5B). In a manner similar to the first technique, a reconstructed representation of the instantaneous phase signal varies over a range of $2\pi$ radians between $-\pi/2$ radians to $+3\pi/2$ radians over a period defined as a duration between adjacent rising edge transitions in the binarized representation $y_B(t)$ of an acquired pulse echo signal. By contrast with the first technique discussed above, in the second technique, a piece-wise linear approximation of the phase as shown in FIG. 5C is constructed by dividing respective periods between adjacent rising edge transitions into two sub-periods defining different segments (e.g., segments that can have different slopes).

For example, as shown illustratively in FIG. 5A, a rising edge transition in the binarized signal is detected as shown in FIG. 5B at time $t_{2n-1}$, and triggers a reset of the reconstructed instantaneous phase, $\hat{\phi}_2(t)$, in FIG. 5C to a value of $-\pi/2$ radians. A next adjacent falling edge transition in the binarized representation in FIG. 5A is detected as shown in FIG. 5B at time $t_{2n}$, and the instantaneous phase $\hat{\phi}_2(t)$ in FIG. 5C is established by varying the phase linearly (e.g., defining a slope) from a value of $-\pi/2$ radians at $t_{2n-1}$ to a value of $+\pi/2$ at $t_{2n}$, defining a first sub-period. A duration between the falling edge transition and a next adjacent rising edge transition at time $t_{2n+1}$ defines a linear transition between a phase value of $\pi/2$ at $t_{2n}$ and a phase value of $+3\pi/2$ at $t_{2n+1}$ to define a second sub-period where the first and second sub-periods form a full pseudo-period. As in the examples of FIG. 4B, the representation in FIG. 5B can be a Dirac distribution $d_2(t)$ representative of instants where rising or falling edge transitions occur in the binarized representation $y_B(t)$ of FIG. 5A. The waveforms shown in FIG. 5B and FIG. 5C are simulated, and the reconstructed instantaneous phase, $\hat{\phi}_2(t)$, can be represented analytically as follows (e.g., for each group of rising-to-falling-to-next-rising edges):

$$\hat{\phi}_2(t) = \begin{cases} O_a(t) \text{ for } t_{2n-1} < t < t_{2n}. \\ O_b(t) \text{ for } t_{2n} < t < t_{2n-1}. \end{cases} \quad \text{(EQN. 5)}$$

Where:

$$O_a(t) = \pi \cdot \left( \frac{t - t_{2n-1}}{t_{2n} - t_{2n-1}} \right) - \frac{\pi}{2} \mod 2\pi \quad \text{(EQN. 6)}$$

and $$O_b(t) = \pi \cdot \left( \frac{t - t_{2n}}{t_{2n-1} - t_{2n}} \right) - \frac{\pi}{2} \mod 2\pi. \quad \text{(EQN. 7)}$$

Figure 5D:
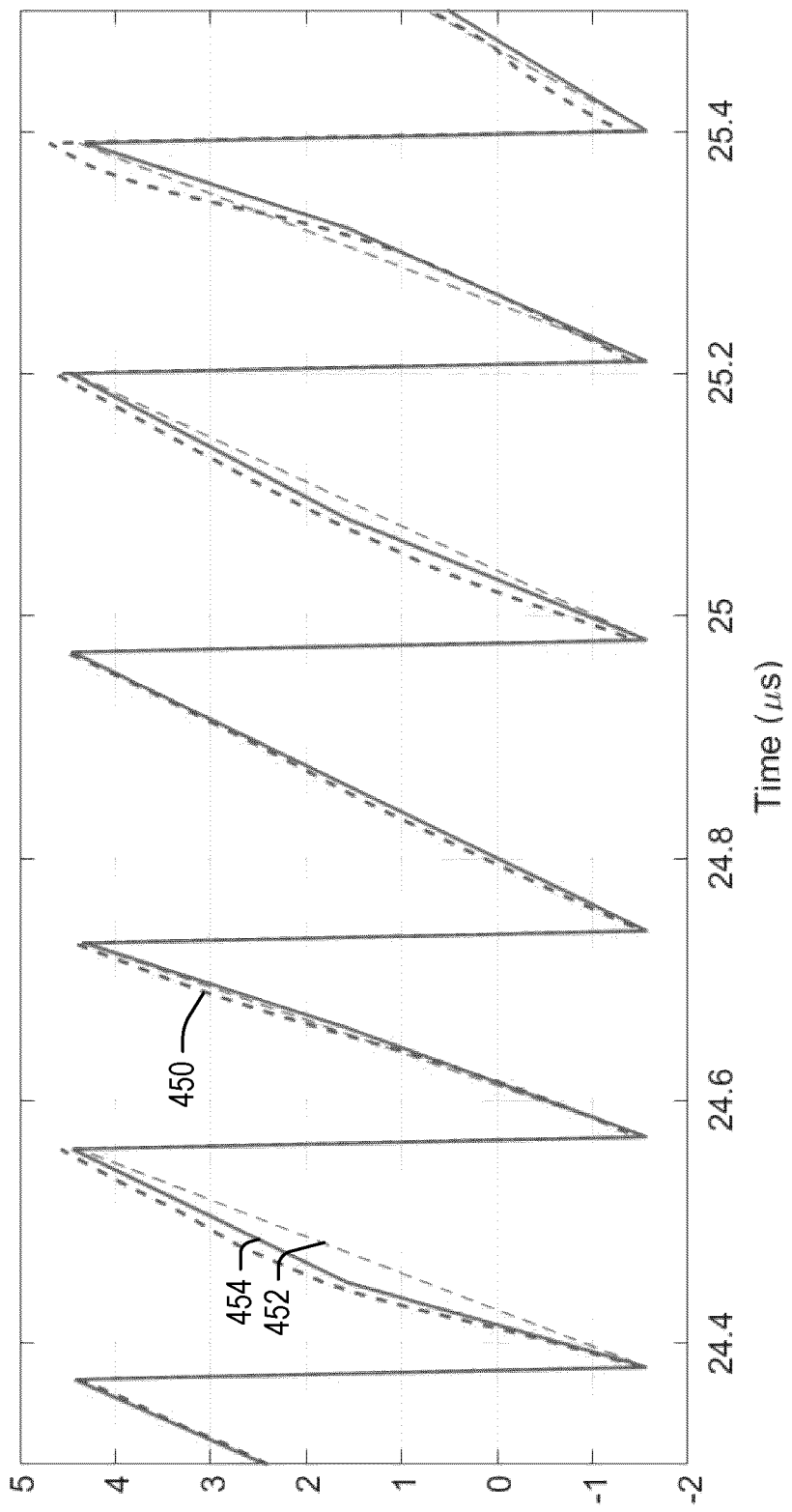
FIG. 5D illustrates generally a comparison between a representation of an instantaneous phase as constructed in FIG. 4C using the first method, a representation of an instantaneous phase as constructed in FIG. 5C using the second method, and the actual acquired instantaneous phase prior to binarization as shown in FIG. 3C.

FIG. 5D illustrates generally a comparison between a representation of an instantaneous phase 452, $\hat{\phi}_1(t)$, as constructed in FIG. 4C using the first technique, as compared to the actual acquired instantaneous phase prior to binarization 450 as shown earlier in FIG. 3C, along with another representation of the instantaneous phase 454, $\hat{\phi}_2(t)$, constructed as in FIG. 5C using the second technique. Both the recovered phase 452 and 454 reasonably track values of the instantaneous phase 450, with the second technique used to provide the phase 454 resulting in a better approximation of the instantaneous phase 450 prior to binarization, at the cost of slightly higher reconstruction complexity.

Figure 6A:
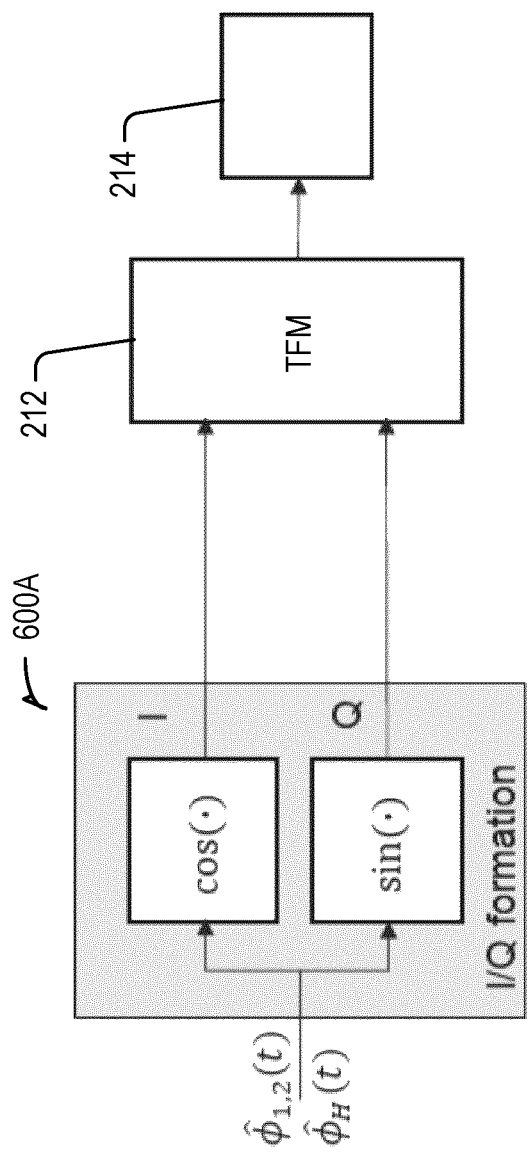
FIG. 6A illustrates generally an example comprising a portion of a receive signal chain that can be used to provide in-phase and quadrature signals from a phase signal, such as can be used for a phase-summation TFM imaging technique.
Figure 6B:
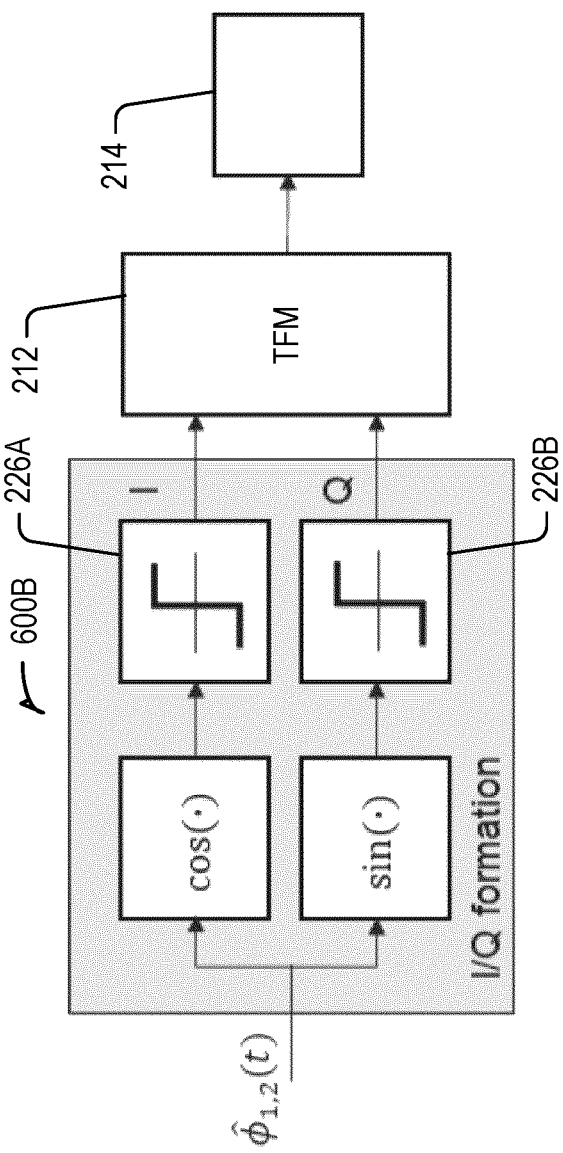
FIG. 6B illustrates generally another example comprising a portion of a receive signal chain that can be used to provide in-phase and quadrature signals from a phase signal, including binarization of the in-phase and quadrature representations, such as can be used for a phase-summation TFM imaging technique.

FIG. 6A illustrates generally an example comprising a portion of a receive signal chain 600A that can be used to provide in-phase and quadrature signals from a phase signal, such as can be used for a phase-summation TFM imaging technique. As mentioned above, certain imaging or processing techniques can include use of in-phase and quadrature representations of acquired time-domain pulse echo imaging data. In the phase-based approaches described herein, in-phase, "I" ($y_I(t)$) and quadrature, "Q" ($y_Q(t)$) signals can be generated from a representation of an instantaneous phase, such as a phase signal provided by a receiver architecture as shown in FIG. 2B, $\hat{\phi}_H(t)$ (a Hilbert transform applied to the acquired A-scan time-series data y(t) to obtain the instantaneous phase $\hat{\phi}_H(t)$ corresponding to each acquired A-scan time-series, as discussed further below), or reconstructed phase signals corresponding to the first or second techniques described above, $\hat{\phi}_1(t)$ or $\hat{\phi}_2(t)$. Resulting in-phase and quadrature signals (e.g., time series representations in the digital domain) can be provided for TFM imaging at 212 and further processing such as gamma correction or filtering at 214. The present inventors have recognized that the binarization approach for signal acquisition may be applied for phase-based imaging, such as shown in FIG. 6B, which illustrates generally another example of at least a portion of a receive signal chain 600B. In FIG. 6B, in-phase and quadrature representations of reconstructed phase signals, such as $\hat{\phi}_1(t)$ or $\hat{\phi}_2(t)$ can be quantized (e.g., binarized) using comparators 226A and 226B, and the resulting "square" representations can be provided for phase-summation imaging using a TFM approach in a manner similar to FIG. 6A. In yet another example, phase estimates provided using a Hilbert transform could also be provided as an input to the I/Q formation block shown in FIG. 6B. An analytical representation of the binarized or "square" in-phase and quadrature signal is:

$$y_{I_B}(t) = \text{sign}\,[y_I(t)]. \tag{EQN. 8}$$

and $$y_{Q_B}(t) = \text{sign}\,[y_Q(t)]. \tag{EQN. 9}$$

In yet another approach, quantized (e.g., binarized representations) of the in-phase and quadrature signals could be established using a phase values from a unit-circle representation, such as assigned using a look-up table or similar technique. Such a technique can take the place of the sine and cosine functions in either FIG. 6A or FIG. 6B, as illustrative examples. For example, values of $y_I(t)$ and $y_Q(t)$ could be assigned as follows based on a range of phase values in the input instantaneous phase signal $\hat{\phi}(t)$:

TABLE 1

Binarized In-phase and Quadrature Signal Values for Respective Phase Ranges in $\hat{\phi}(t)$.

| Phase | $y_{I_B}(t)$ | $y_{Q_B}(t)$ |
|---|---|---|
| $0 \le \hat{\phi}(t) < -\frac{\pi}{2}$ | +1 | +1 |
| $+\frac{\pi}{2} \le \hat{\phi}(t) < -\pi$ | −1 | +1 |
| $-\pi \le \hat{\phi}(t) < +3\frac{\pi}{2}$ | −1 | −1 |
| $+3\frac{\pi}{2} \le \hat{\phi}(t) < 2\pi$ | +1 | −1 |

FIG. 7 illustrates generally an illustrative example of time-domain in-phase 772 and quadrature 774 signals, such as can be provided using the signal chain shown in FIG. 6A, along with a corresponding binarized representation 770 of an acquired time-series, to show the pi-radian phase relationship between the in-phase and quadrature signals, along with the relative phase versus edge transitions in the binarized representation 770 defining periods of the respective in-phase 772 and quadrature 774 signals.

The phase-summation approach described thus far herein can be used to support various analysis or imaging techniques. For example, summed A-scan generation can be performed, such as by summing time-domain phase representations acquired from multiple transducers or multiple transducer apertures, such as acquired using a PAUT approach.

FIG. 8A illustrates generally an acoustic inspection configuration 1100 including an acoustic probe assembly 150 and a target 158 (e.g., a block with side-drilled holes or "SDH" block), along with a representation of a focal region 1182A used for reconstruction of a summed A-scan 1184A using a phase-based summation approach as shown illustratively in FIG. 8B. Referring to FIG. 8A, respective rays 1180A representing a propagation direction of a reflected ultrasound wave can be acquired by an ultrasound transducer array included as a portion of the probe assembly 150. In the example of FIG. 8A, the rays 1180A are used to determine delay values to each acquired A-scan time series to create the focal region 1182A that happens to be well-aligned with a flaw 160 location. Such an example is merely illustrative and a transmit focusing approaching could also be used, either in addition to or instead of receive-side beam-forming.

Referring to FIG. 8B, a plurality of instantaneous phase signals 1196A are acquired, such as corresponding to different receive transducers or receive apertures, where each phase signal is delayed as mentioned above to establish the focal region 1182A. The resulting plurality of phase signals 1196A are then summed coherently, such as on a sample-by-sample basis to provide a time-domain summed A-scan 1184A. Because the amplitude information has not been retained, the A-scan representation shows little amplitude excursion outside a region 1198A of phase coherence associated with the flaw 160 in the focal region 1182A. As mentioned elsewhere, use of phase data instead of raw A-scan time series data can provide various enhancements in terms of data volume or measurement throughput, or can simplify the receiver configuration, as illustrative examples.

Figure 9B:
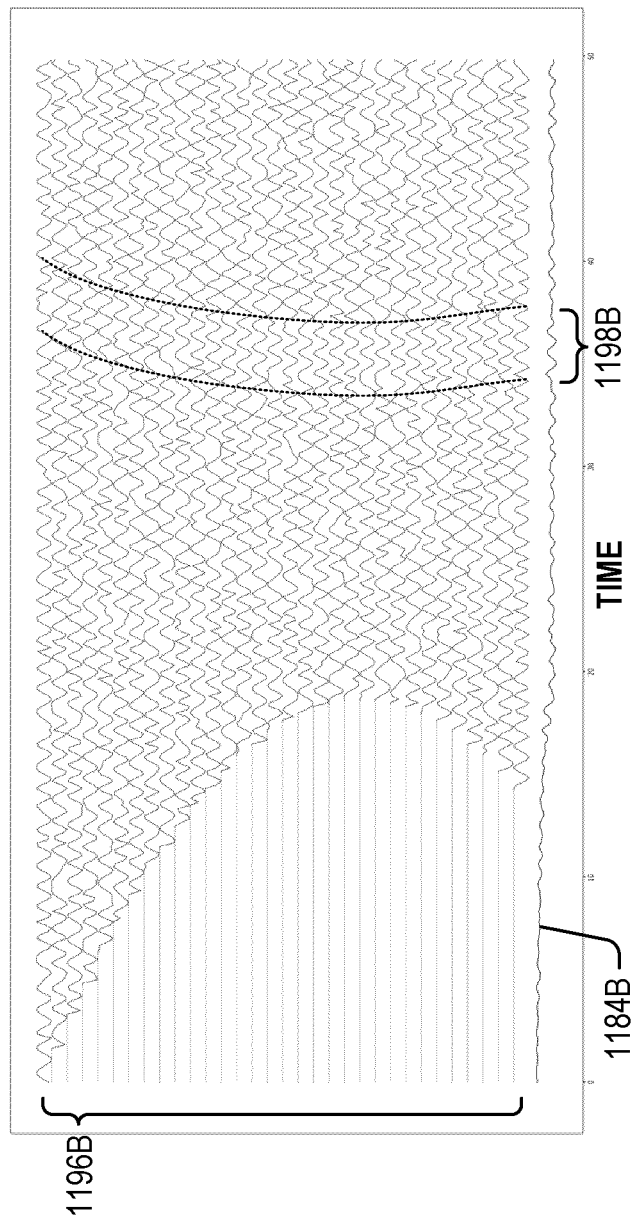
FIG. 9B illustrates generally an illustrative example of a plurality of acquired phase signals that have been respectively delayed to provide focus at the region shown in FIG. 9A, and a corresponding summation of such signals according to a phase-based summation approach.
Figure 9A:
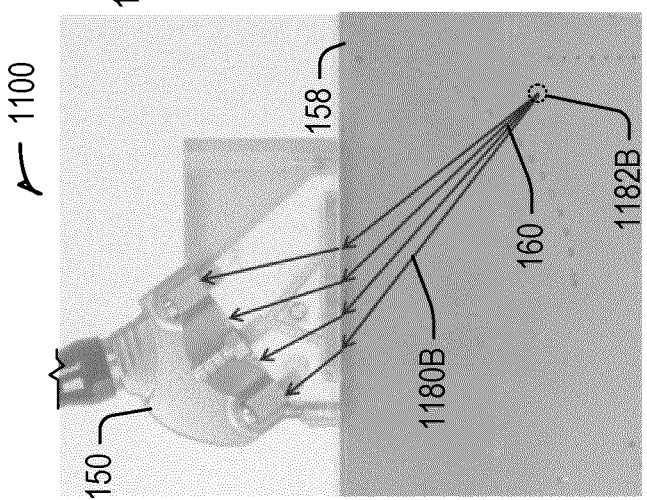
FIG. 9A illustrates generally an acoustic inspection configuration including an acoustic probe assembly and a target, along with a representation of a focal region used for reconstruction of an A-scan using a phase-based summation approach as shown illustratively in FIG. 9B.

FIG. 9A illustrates generally an acoustic inspection configuration 1100 including an acoustic probe assembly 150 and a target 158, along with a representation of a focal region 1182B used for reconstruction of a summed A-scan using a phase-based summation approach as shown illustratively in FIG. 9B. In FIG. 9A, the focal region 1182B is not well-aligned with the flaw 160 in the SDH block, by contrast with the example 1182A of FIG. 8A. FIG. 9B illustrates generally an illustrative example of a plurality of acquired phase signals 1196B that have been respectively delayed to provide focus at the region 1182B shown in FIG. 9A, and a corresponding summation 1184B of such signals according to a phase-based summation approach. Phase coherence is still visible in the region 1198B, but less so because the focal region 1182B is not well-aligned with the flaw 160 (and the corresponding flaw echo portions of each of the signals 1196B are not time-aligned after delays are applied, as shown by the curved dashed lines). The present inventors have recognized that such behavior might be addressed by computing a series of A-scan summations similar to summations 1184A of FIGS. 8B and 1184B of FIG. 9B at different focal locations within the target.

Other techniques can be used to separate a region of weak phase coherence in the region 1198B from other portions of the summed A-scan 1184B. For example, a spatial noise distribution within the target 150 could be established either empirically or through an analytical model. A value in the summed A-scan 1184B could adjust based on a probability that an amplitude value in the sum corresponds to noise versus a flaw or other feature of interest, or such an adjustment could be performed in respective received signals in the plurality of phase signals 1196B, such as suppressing a contribution in a region or amplitude range where the contribution is likely to be noise as indicated by the distribution.

Other approaches can be used, such as by determining a moment value, such as a variance, skewness, or kurtosis of a statistical distribution corresponding to a respective spatial location (or time index in the case of the summed A-scan), and using such a determination to set a threshold applied to constituent phase signals 1196B below which any contribution to the summation will be ignored or de-weighted. Such statistical approaches based on a noise distribution are also believed applicable to TFM imaging approaches involving phase summation, where a pixel or voxel value (e.g., a brightness value) can be adjusted accordingly.

Figure 10C:
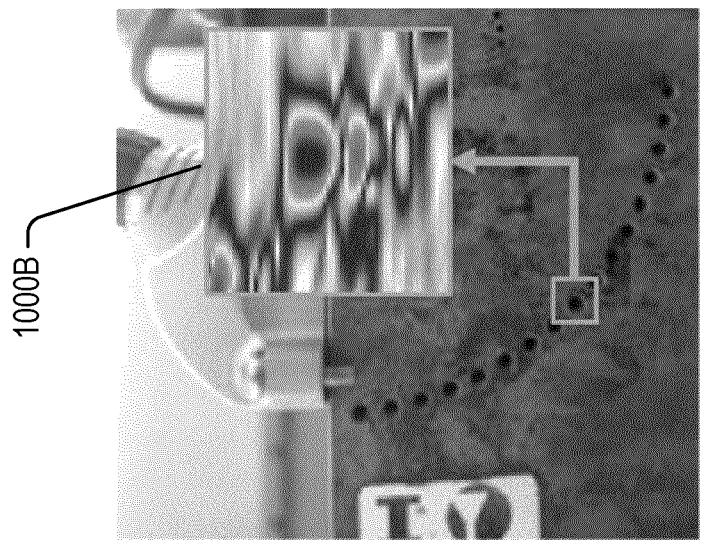
FIG. 10C illustrates generally an acoustic inspection configuration including an inlaid detail region from the TFM image constructed using a phase-summation approach.
Figure 10B:
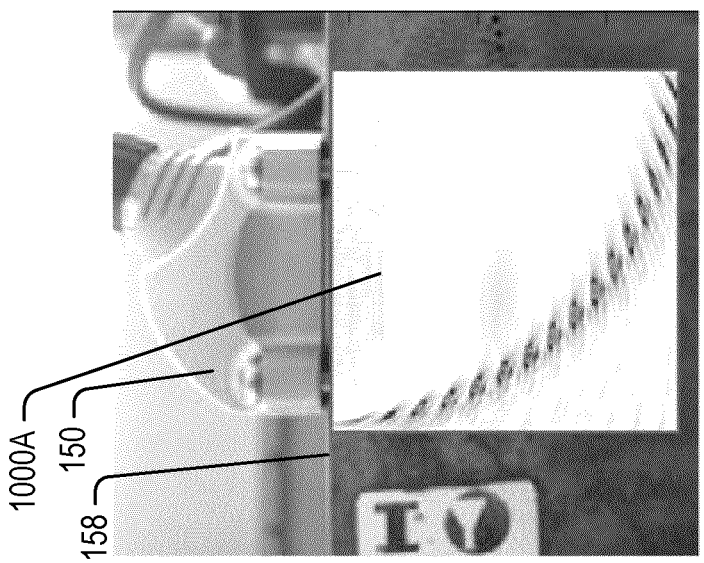
FIG. 10B illustrates generally an acoustic inspection configuration including an overlaid TFM image constructed using a phase summation approach.
Figure 10A:
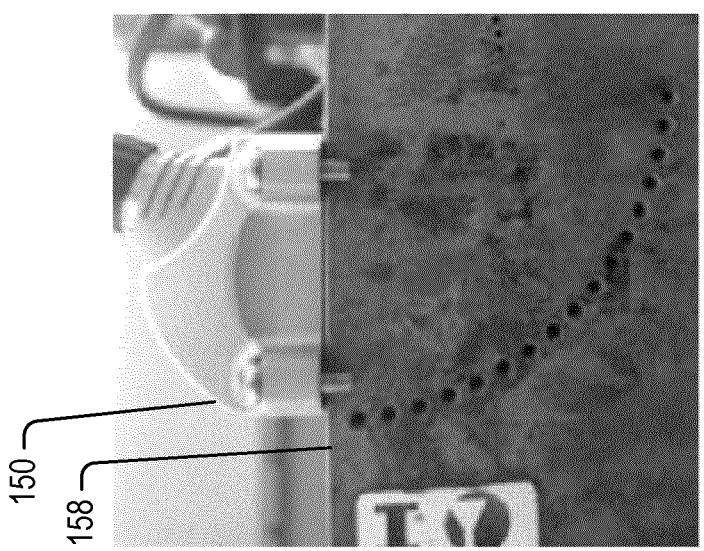
FIG. 10A illustrates generally an acoustic inspection configuration including an acoustic probe assembly and a target.

FIG. 10A illustrates generally an acoustic inspection configuration including an acoustic probe assembly 150 and a target 158 (comprising a side-drilled hole or "SDH" block), for use in obtaining experimental data as discussed in various examples below. The probe assembly is an Olympus 5L64-A32 probe in which the first 32 elements are used, where the probe is excited using a transmit center frequency of 5 MHz, with the transducer pitch being 0.5 millimeters, an elevation of 10 millimeters, and external dimensions of 40 millimeters by 28 millimeters in the plane of the transducer array, and a height of 26 millimeters. FIG. 10B illustrates generally an acoustic inspection configuration including an overlaid TFM image 1000A constructed using a phase summation approach, for purposes of illustrating a relationship between features shown in the TFM image 1000A versus flaw locations in the target 158. FIG. 10C illustrates generally an acoustic inspection configuration including an inlaid detail region 1000B from the TFM image 1000A of FIG. 10B, constructed using a phase-summation approach. The inlaid detail region 1000B is used to show qualitative variations across different applications of the phase-summation approach in further examples below.

Figure 11:
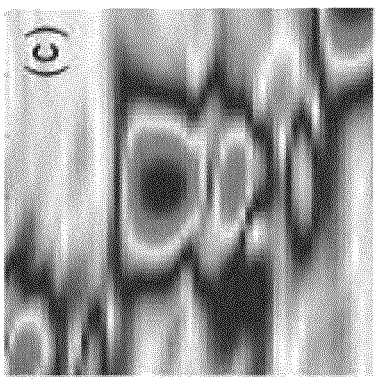
FIG. 11 illustrates generally illustrative examples of TFM images of the inlaid detail region from FIG. 10C constructed using different variations of the phase-summation approach.

FIG. 11 illustrates generally illustrative examples of TFM images of the inlaid detail region from FIG. 10C constructed using different variations of the phase-summation approach. A reference implementation of the phase-summation approach can include coherently summing time-domain phase signals in manner similar to processing of full analytic representations of acquired A-Scans but using only time-domain representations of the instantaneous phase. In the reference implementation, A-scans are experimentally acquired as mentioned above using 32 apertures, and a Hilbert transform is applied to the acquired A-scan time-series data y(t) to obtain the instantaneous phase $\hat{\phi}_H$ (t) corresponding to each acquired A-scan time-series, using the following expression:

$$\hat{\phi}_H(t) = \arctan\left\{\frac{\mathcal{H}_-y(t)_-}{y(t)}\right\} \quad \text{(EQN. 10)}$$

As in other examples, in-phase $y_{IH}(t)$ and quadrature $y_{QH}(t)$ representations of the Hilbert-transform instantaneous phase can be constructed, and then provided for TFM imaging as if the acquired phase signals were A-scan time-series data:

$$y_{IH}(t) = \cos_{O_H}(t). \quad \text{(EQN. 11)}$$

$$y_{QH}(t) = \sin_{O_H}(t). \quad \text{(EQN. 12)}$$

Figure 12:
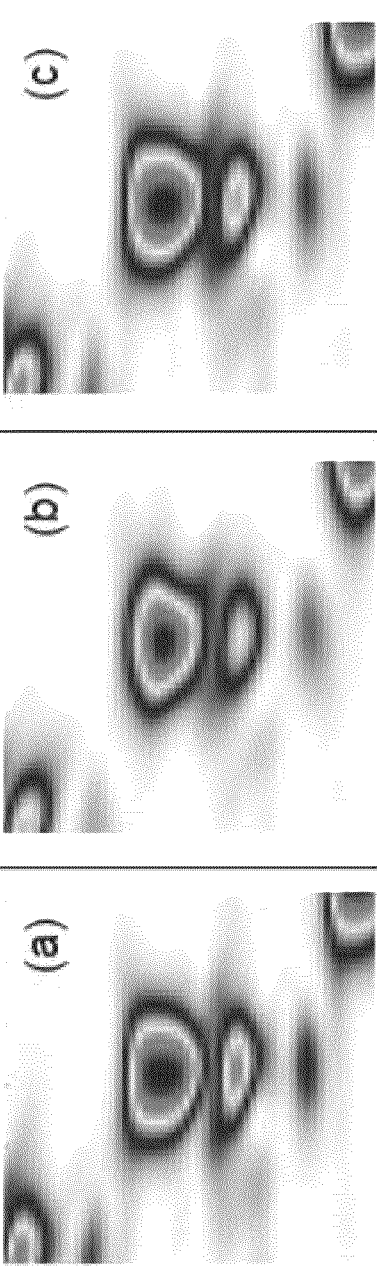
FIG. 12 illustrates generally illustrative examples of TFM images of the inlaid detail region from FIG. 10C constructed using different variations of the phase-summation approach along with a filtering technique.

A resulting phase-summation TFM image of the inlaid region (including SDH flaw) is shown at FIG. 11 at (a), along with TFM images at (b) and (c) constructed using the first or second techniques, respectively, to recover the instantaneous phase signals $\hat{\phi}_1(t)$ and $\hat{\phi}_2(t)$, respectively. By way of comparison, the second technique shown in FIG. 11 at (c) results in an image that more closely resembles the reference image in FIG. 11 at (a), although both the images at (b) and (c) generally show the same flaw location and other image features (in the center of each image). As further examples, use of binarized or "square" I/Q representations as mentioned above in relation to the receive scheme of FIG. 6B can result in TFM images in FIG. 11 at (d) and at (e) that show considerable roughness as compared to the reference image in FIG. 11 at (a). To remedy the roughness of the images obtained using "square" in-phase and quadrature representations, further processing can be performed. For example, gamma correction can be performed, such as on a pixel-by-pixel basis or voxel-by-voxel basis. A low-pass filter or other image mask can be used, such as after gamma correction to provide smoothing. For example, FIG. 12 illustrates generally illustrative examples of TFM images of the inlaid detail region from FIG. 10C constructed using different variations of the phase-summation approach along with a filtering technique. The images of FIG. 12 at (a), (b), (c), (d), and (e) were constructed in a manner similar to the corresponding examples in FIG. 11. However, in FIG. 12, each image was gamma corrected and low-pass filtered. Low pass filtering was performed using a two-dimensional convolution using a kernel:

$$h(k,l) = \frac{1}{9}\begin{pmatrix} 1 & 1 & 1 \\ 1 & 1 & 1 \\ 1 & 1 & 1 \end{pmatrix}. \quad \text{(EQN. 13)}$$

Generally, then experimentally-obtained A-scan data and resulting phase-summation imaging of the examples of FIG. 11 and FIG. 12 illustrate that a phase-summation approach can be used to provide TFM imaging using either sampled or reconstructed instantaneous phase signals where flaws such as a side-drilled hole in a test block target are readily apparent.

Figure 13:
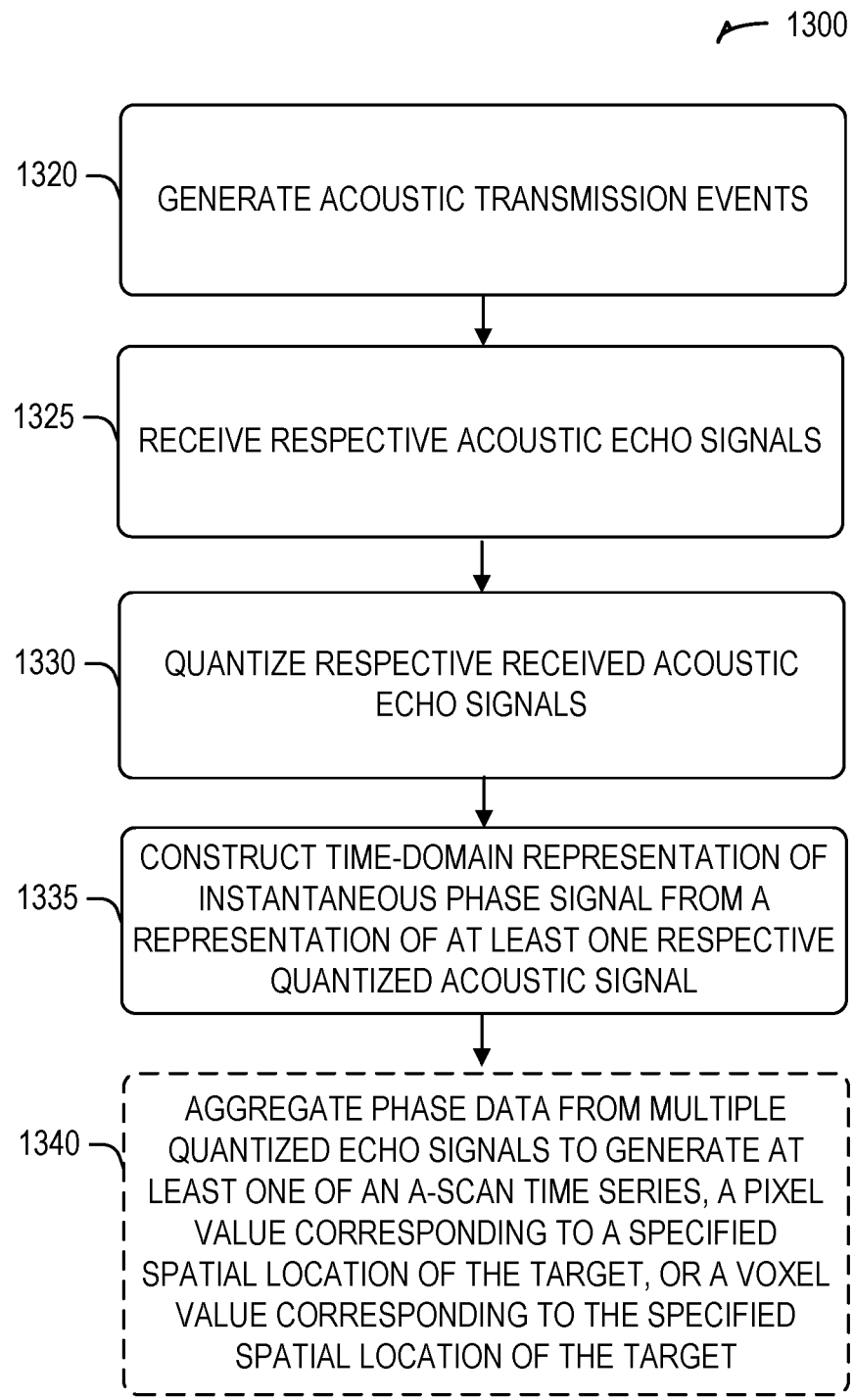
FIG. 13 illustrates generally a technique, such as a method, comprising digitizing an acoustic echo signal and constructing a time-domain representation of an instantaneous phase signal.

FIG. 13 illustrates generally a technique 1300, such as a method, comprising acquiring and digitizing an acoustic echo signal and constructing a time-domain representation of an instantaneous phase signal. At 1320, acoustic transmission events can be generated such as corresponding to transmit firings of one or more transducers in an ultrasonic transducer array. At 1325, in response to respective transmit events, respective acoustic echo signals can be received. Such acoustic echo signals can correspond to A-scan signals. At 1330, the respective received acoustic echo signals can be quantized, such as to provide a discrete-time or digital representation of the received acoustic echo signals. The discrete-time or digitized representations can be transmitted elsewhere for further processing, or other data indicative of the discrete-time or digitized representations, such as temporal locations of edge transitions, can be transmitted elsewhere. At 1335, a time-domain representation of an instantaneous phase signal can be constructed from a representation of at least one respective quantized acoustic signal. Such a time-domain representation can be constructed using the first or second phase signal construction techniques discussed above in detail in relation to FIG. 4A, FIG. 4B, FIG. 4C, FIG. 5A, FIG. 5B, or FIG. 5C, for example. Optionally, at 1340, phase data (such as reconstructed time-domain representations of instantaneous phase signals) can be aggregated from multiple acquired and quantized echo signals to generate at least of an A-scan time series (e.g., a summed A-scan), or a pixel or voxel value corresponding to a specified spatial location of a target (e.g., as in a TFM imaging approach using phase summation).

Figure 14:
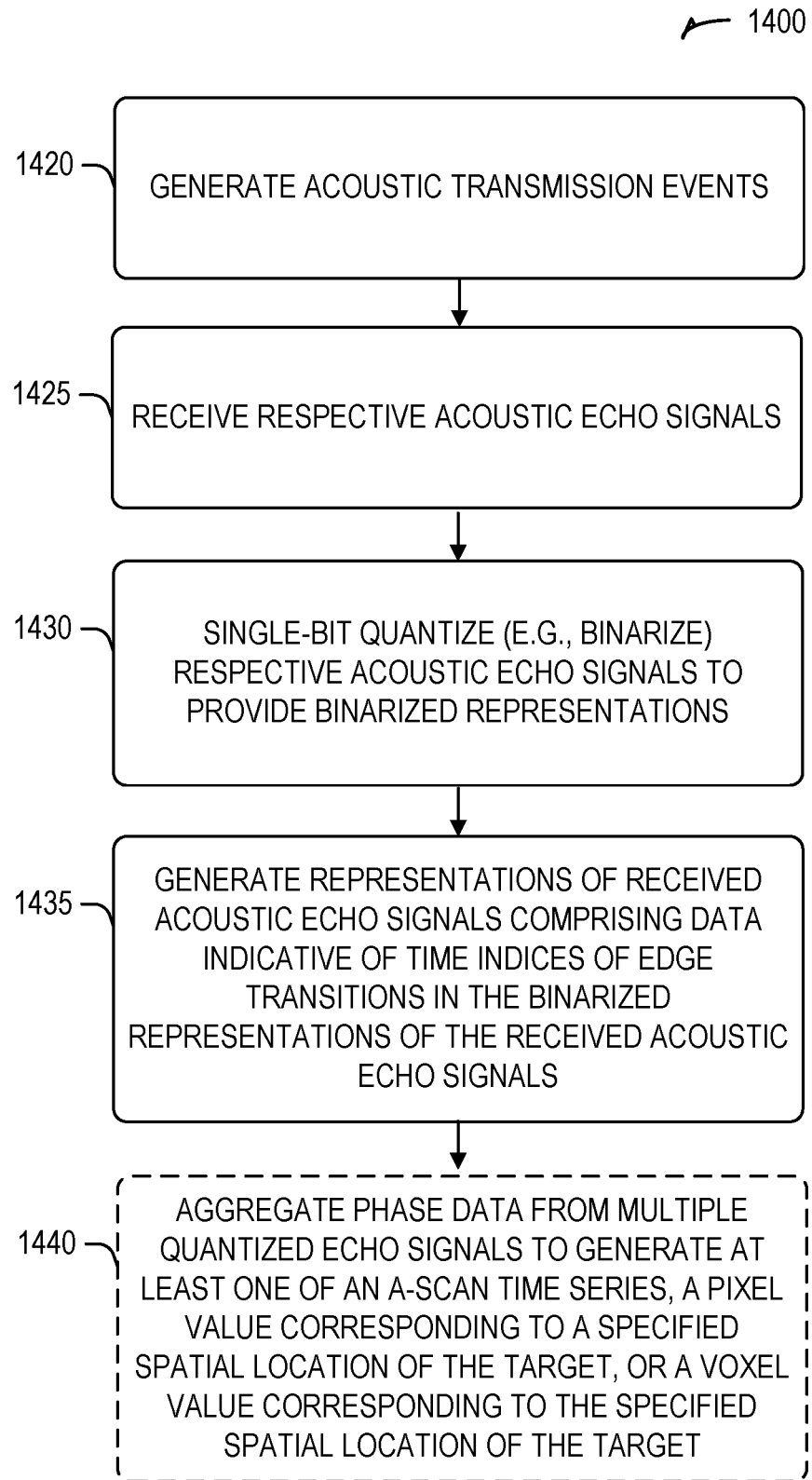
FIG. 14 illustrates generally another technique, such as another method, comprising single-bit quantizing (e.g., binarizing) an acoustic echo signal and generating representation of received acoustic echo signals comprising data indicative of time indices of edge transitions in the binarized acoustic echo signal.

FIG. 14 illustrates generally another technique 1400, such as another method, comprising acquiring and single-bit quantizing (e.g., binarizing) an acoustic echo signal and generating representation of received acoustic echo signals comprising data indicative of time indices of edge transitions in the binarized acoustic echo signal. At 1420, acoustic transmission events can be generated such as corresponding to transmit firings of one or more transducers in an ultrasonic transducer array. At 1425, in response to respective transmit events, respective acoustic echo signals can be received.

Such acoustic echo signals can correspond to A-scan signals. At 1430, the respective received acoustic echo signals can be acquired and single-bit quantized to provide binarized representations of the received acoustic echo signals. The binarized representations can be transmitted elsewhere for further processing, or other data indicative of the discrete-time or digitized representations, such as temporal locations of edge transitions, can be transmitted elsewhere. For example, at 1435, data indicative of edge transitions in the binarized representations of the received acoustic echo signals can be generated (e.g., edge transitions can be detected and time indices of such transitions can be encoded). Optionally, at 1440, phase data (such as reconstructed time-domain representations of instantaneous phase signals from the encoded data generated at 1435) can be aggregated from multiple acquired and quantized echo signals to generate at least of an A-scan time series (e.g., a summed A-scan), or a pixel or voxel value corresponding to a specified spatial location of a target (e.g., as in a TFM imaging approach using phase summation).

Figure 15:
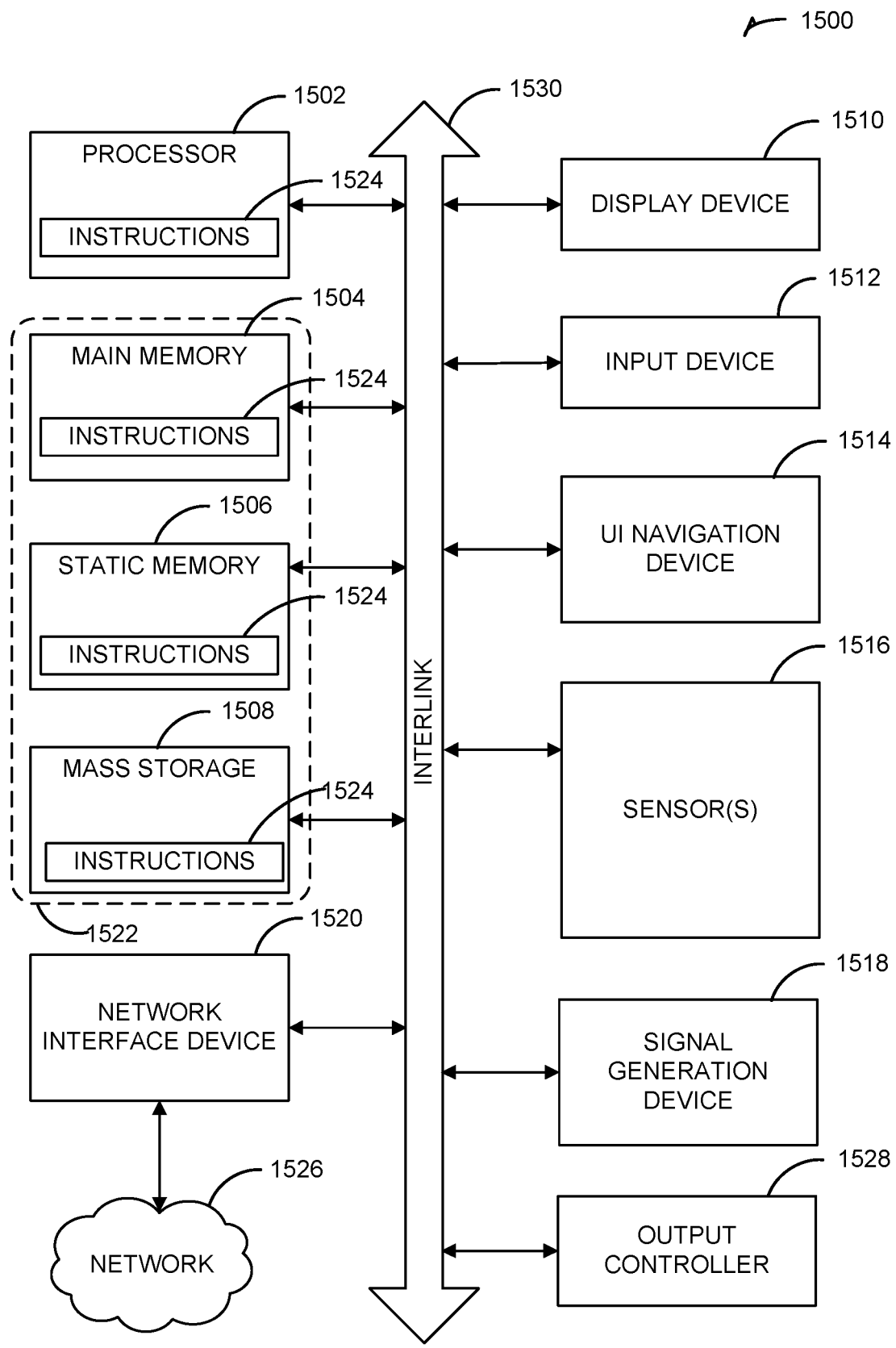
FIG. 15 illustrates a block diagram of an example comprising a machine upon which any one or more of the techniques (e.g., methodologies) discussed herein may be performed.

FIG. 15 illustrates a block diagram of an example comprising a machine 1500 upon which any one or more of the techniques (e.g., methodologies) discussed herein may be performed. In various examples, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in peer-to-peer (P2P) (or other distributed) network environment. The machine 1500 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 1500 may include a hardware processor 1502 (e.g., a central processing unit (CPU), a graphics processing unit (GPU), a hardware processor core, or any combination thereof), a main memory 1504 and a static memory 1506, some or all of which may communicate with each other via an interlink (e.g., bus) 1530. The machine 1500 may further include a display unit 1510, an alphanumeric input device 1512 (e.g., a keyboard), and a user interface (UI) navigation device 1514 (e.g., a mouse). In an example, the display unit 1510, input device 1512 and UI navigation device 1514 may be a touch screen display. The machine 1500 may additionally include a storage device (e.g., drive unit) 1516, a signal generation device 1518 (e.g., a speaker), a network interface device 1520, and one or more sensors 1521, such as a global positioning system (GPS) sensor, compass, accelerometer, or other sensor. The machine 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1516 may include a machine-readable medium 1522 on which is stored one or more sets of data structures or instructions 1524 (e.g., software) embodying or utilized by any one or more of the techniques or functions described herein. The instructions 1524 may also reside, completely or at least partially, within the main memory 1504, within static memory 1506, or within the hardware processor 1502 during execution thereof by the machine 1500. In an example, one or any combination of the hardware processor 1502, the main memory 1504, the static memory 1506, or the storage device 1516 may constitute machine-readable media.

While the machine-readable medium 1522 is illustrated as a single medium, the term "machine-readable medium" may include a single medium or multiple media (e.g., a centralized or distributed database, and/or associated caches and servers) configured to store the one or more instructions 1524.

The term "machine-readable medium" may include any medium that is capable of storing, encoding, or carrying instructions for execution by the machine 1500 and that cause the machine 1500 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 1524 may further be transmitted or received over a communications network 1526 using a transmission medium via the network interface device 1520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks such as conforming to one or more standards such as a 4G standard or Long Term Evolution (LTE)), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others). In an example, the network interface device 1520 may include one or more physical jacks (e.g., Ethernet, coaxial, or phone jacks) or one or more antennas to connect to the communications network 1526. In an example, the network interface device 1520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1500, and includes digital or analog communications signals or other intangible medium to facilitate communication of such software.

VARIOUS NOTES

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A machine-implemented method for acoustic evaluation of a target, the method comprising:
   generating respective acoustic transmission events via selected transmitting ones of a plurality of electroacoustic transducers;
   in response to the respective acoustic transmission events, receiving respective acoustic echo signals from other receiving ones of the plurality of electroacoustic transducers;
   single-bit quantizing the respective received acoustic echo signals to provide binarized representations; and
   constructing a time-domain representation of an instantaneous phase signal from a binarized representation of at least one respective quantized acoustic echo signal using time indices of edge transitions in the binarized representation.

2. The machine-implemented method of claim 1, wherein the quantizing the respective received acoustic echo signals is performed using a first device;

wherein the machine-implemented method comprises transmitting respective representations of the quantized received acoustic echo signals to a second device; and wherein the constructing the time-domain representation of the instantaneous phase signal is performed on the second device for use in constructing at least one of an A-Scan representation or an image.

3. The machine-implemented method of claim 1, wherein single-bit quantizing a respective acoustic echo signal to provide a binarized representation comprises detecting portions of a time-domain echo signal exceeding a specified signal magnitude threshold.

4. The machine-implemented method of claim 1, comprising aggregating phase data from multiple quantized echo signals to generate at least one of an A-scan time series, a pixel value corresponding to a specified spatial location of the target, or a voxel value corresponding to the specified spatial location of the target.

5. The machine-implemented method of claim 4, wherein the generating the pixel or voxel value comprises performing a summation of respective received acoustic echo signals using a Total Focusing Method (TFM) technique applied to in-phase and quadrature time-domain representations of the phase data.

6. The machine-implemented method of claim 5, wherein the generating respective acoustic transmission events via selected transmitting ones of the plurality of electroacoustic transducers and in response to the respective acoustic transmission events, receiving the respective acoustic echo signals from other receiving ones of the plurality of electroacoustic transducers comprises performing a full-matrix-capture (FMC) acquisition, the respective acoustic echo signals comprising A-scans corresponding to respective elements in matrix of received signals.

7. The machine-implemented method of claim 5, comprising:

generating imaging data comprising a plurality of generated pixel or voxel values, the plurality of generated pixel or voxel values generated using the Total Focusing Method (TFM) applied to respective in-phase and quadrature time-domain representations of phase data; and applying a mask to the imaging data.

8. The machine-implemented method of claim 4, comprising establishing a noise distribution corresponding to a region of interest encompassing the specified spatial location empirically or through an analytical model.

9. The machine-implemented method of claim 4, comprising adjusting a pixel or voxel amplitude value based on a probability that the amplitude value corresponds to noise by weighting a corresponding term in a summation of received acoustic echo signals.

10. The machine-implemented method of claim 4, comprising suppressing or inhibiting a contribution to the pixel or voxel value corresponding to noise.

11. The machine-implemented method of claim 4, wherein generating the pixel or voxel value corresponding to a specified spatial location of the target includes applying a moment value of a statistical distribution determination to respective pixel or voxel values.

12. The machine-implemented method of claim 11, wherein the moment value corresponds to a variance.

13. The machine-implemented method of claim 4, wherein the aggregating the phase data comprises generating in-phase and quadrature time-domain representations of the phase data from respective instantaneous phase signals, the instantaneous phase signals constructed from the quantized received acoustic echo signals.

14. The machine-implemented method of claim 13, wherein the aggregating the phase data comprises quantizing the in-phase and quadrature time-domain representations of the phase data.

15. The machine-implemented method of claim 1, wherein the time-domain representation of the instantaneous phase signal comprises a piece-wise construction.

16. The machine-implemented method of claim 15, wherein a slope of a segment in the piece-wise construction is established at least in part by determining a duration between adjacent transitions of a quantized representation of the acoustic echo signal.

17. The machine-implemented method of claim 15, wherein the piece-wise construction includes assigning a phase difference of 2 radians between a time index corresponding to a first rising edge of the quantized representation and a later time index of the quantized representation, corresponding to a next rising edge, to define a slope of a segment.

18. The machine-implemented method of claim 15, wherein the piece-wise construction includes assigning a phase difference of $\pi$ radians between a time index corresponding to a first rising edge of the quantized representation and a later time index of the quantized representation, corresponding to a first falling edge, to define a slope of a segment.

19. The machine-implemented method of claim 18, wherein the piece-wise construction includes assigning another phase difference of $\pi$ radians between the time index corresponding to the first falling edge of the quantized representation and a later time index of the quantized representation, corresponding to a second rising edge, to define a slope of another segment.

20. The machine-implemented method of claim 1, comprising transmitting the representations of the respective acoustic echo signals to another device for aggregating phase data corresponding to the received echo signals;

wherein the method comprises generating at least one of an A-scan time series, a pixel value corresponding to a specified spatial location of the target, or a voxel value corresponding to the specified spatial location of the target.

21. The machine-implemented method of claim 20, wherein the transmitting comprises wirelessly transmitting the quantized representations of the respective acoustic echo signals.

22. An apparatus for acoustic evaluation of a target, the apparatus comprising:

drive circuitry to generate respective acoustic transmission events via selected transmitting ones of a plurality of electroacoustic transducers;

receiver circuitry comprising a coherent receiver topology to provide in-phase and quadrature representations of respective acoustic echo signals from other receiving ones of the plurality of electroacoustic transducers;

analog-to-digital conversion circuitry to digitize the respective acoustic echo signals; and processor circuitry configured to:

generate respective acoustic transmission events via selected transmitting ones of a plurality of electroacoustic transducers;

in response to the respective acoustic transmission events, receive respective acoustic echo signals from other receiving ones of the plurality of electroacoustic transducers;

single-bit quantize the respective received acoustic echo signals to provide binarized representations; and construct a time-domain representation of an instantaneous phase signal from a binarized representation of at least one respective quantized acoustic echo signal using time indices of edge transitions in the binarized representation.

23. The apparatus of claim 22, wherein the processor circuitry configured to quantize the respective received acoustic echo signals is associated with a first device;

wherein the apparatus comprises a transceiver configured to transmit respective representations of the quantized received acoustic echo signals to a second device; and wherein the processor circuitry configured to construct the time-domain representation of the instantaneous phase signal is associated with a second device for use in constructing at least one of an A-Scan representation or an image.

24. The apparatus of claim 22, wherein the processor circuitry is configured to:

aggregate phase data from multiple quantized echo signals to generate a pixel value corresponding to a specified spatial location of the target or a voxel value corresponding to the specified spatial location of the target, including performing a summation of respective received acoustic echo signals using a Total Focusing Method (TFM) technique applied to in-phase and quadrature time-domain representations of corresponding instantaneous phase signals.

25. The apparatus of claim 22, wherein the time-domain representation of the instantaneous phase signal comprises a piece-wise construction.

* * * * *

UNITED STATES PATENT AND TRADEMARK OFFICE
CERTIFICATE OF CORRECTION

PATENT NO. : 12,216,091 B2
APPLICATION NO. : 17/905107
DATED : February 4, 2025
INVENTOR(S) : Painchaud-April et al.

Page 1 of 1

It is certified that error appears in the above-identified patent and that said Letters Patent is hereby corrected as shown below:

In the Claims

In Column 22, Line 17, in Claim 17, delete "2" and insert --$2\pi$-- therefor

Signed and Sealed this
Twelfth Day of August, 2025

Coke Morgan Stewart
*Acting Director of the United States Patent and Trademark Office*